United States Patent
Tokuno et al.

(10) Patent No.: US 12,259,526 B2
(45) Date of Patent: Mar. 25, 2025

(54) IMAGING LENS

(71) Applicant: Tokyo Visionary Optics Co., Ltd., Tokyo (JP)

(72) Inventors: Koki Tokuno, Tokyo (JP); Ruidong Yang, Tokyo (JP)

(73) Assignee: TOKYO VISIONARY OPTICS Co., Ltd., Tokyo (JP)

( * ) Notice: Subject to any disclaimer, the term of this patent is extended or adjusted under 35 U.S.C. 154(b) by 231 days.

(21) Appl. No.: 17/453,599

(22) Filed: Nov. 4, 2021

(65) Prior Publication Data
US 2023/0003975 A1 Jan. 5, 2023

(30) Foreign Application Priority Data
Nov. 4, 2020 (JP) .................... 2020-184287

(51) Int. Cl.
*G02B 13/00* (2006.01)
*G02B 9/60* (2006.01)

(52) U.S. Cl.
CPC ........... *G02B 13/0045* (2013.01); *G02B 9/60* (2013.01)

(58) Field of Classification Search
CPC ............................. G02B 13/0045; G02B 9/60
USPC ......................................................... 359/714
See application file for complete search history.

(56) References Cited

U.S. PATENT DOCUMENTS

2021/0055522 A1\* 2/2021 Li ........................... G02B 9/60

FOREIGN PATENT DOCUMENTS

| CN | 106980167 A | 7/2017 |
|---|---|---|
| CN | 110007442 A | 7/2019 |
| CN | 110531492 A | 12/2019 |
| JP | 2014123097 A | 7/2014 |
| JP | 2022042933 A | 3/2022 |

\* cited by examiner

*Primary Examiner* — Wyatt A Stoffa
*Assistant Examiner* — Mitchell T Oestreich
(74) *Attorney, Agent, or Firm* — Maine Cernota & Curran

(57) ABSTRACT

There is provided an imaging lens having a low profile and a low F-number and allowing satisfactory correction of aberrations. An imaging lens comprises in order from an object side, a first lens L1 with positive refractive power, a second lens L2 with negative refractive power, a third lens L3, a fourth lens L4 with positive refractive power, and a fifth lens L5 with negative refractive power, wherein an image-side surface of said fourth lens L4 is convex in a paraxial region, an object-side surface of said fifth lens L5 is an aspheric surface having at least one inflection point, and the following conditional expressions are satisfied:

$$f/\text{Dep} < 2.0 \qquad (1)$$

$$1.2 < T3/T2 < 1.8 \qquad (2)$$

$$15 < vd3 < 35 \qquad (3)$$

$$-1.0 < R5f/R5r < -0.3 \qquad (4)$$

where
f: a focal length of the overall optical system of the imaging lens,
Dep: an entrance pupil diameter of the imaging lens,
T2: a thickness along the optical axis X of the second lens L2,
T3: a thickness along the optical axis X of the third lens L3,
vd3: an abbe number at d-ray of the third lens L3,
R5f: a curvature radius of an object-side surface of the fifth lens L5, and
R5r: a curvature radius of an image-side surface of the fifth lens L5.

6 Claims, 11 Drawing Sheets

IMAGING LENS

The present invention relates to an imaging lens for forming an image of an object on an image sensor, such as a CCD sensor and a CMOS sensor.

With the development of IoT (Internet of Things) technology, portable information devices, such as smartphones and cellular phones, as well as many products and devices, such as game consoles, home appliances, and automobiles, are connected to networks, and various types of information are shared between these "Things". In the IoT environment, various services are allowed to be provided using image information from cameras built in the "Things". The image information transmitted through networks continuously increases every year and such a camera is expected to be compact and to have high resolution.

The imaging lens described in Patent Document 1 is consist of five lenses, and includes: a first lens with positive refractive power; a second lens with negative refractive power; a third lens with negative refractive power; a fourth lens with positive refractive power; and a fifth lens with negative refractive power. In the imaging lens, when a focal length of the first lens, a focal length of the second lens, a focal length of the fourth lens, a thickness along an axis of the first lens, a shape of an object-side surface of the second lens, and a shape of the fifth lens satisfy a certain condition, a wide field of view and downsizing of the imaging lens can be co-achieved.

Patent Document 1: Chinese Patent Application Publication No. 110531492

The above imaging lens described in Patent Document 1 allows relatively satisfactory correction of aberrations while being compact. However, the resolution expected from the imaging lens increases every year, and considering adaptation of high resolution, the lens configuration described in Patent Document 1 causes insufficient correction of aberrations. Furthermore, in recent years, from the perspective of photographing in an environment of small light quantity or suppression of blurring of the object during photographing, a low F-number of the imaging lens is strongly requested.

It is an object of the present invention to provide an imaging lens which is low in a profile and has a small F-number, and is capable of satisfactorily correcting aberrations.

An imaging lens according to the present invention for forming an image of an object on an image sensor includes: in order from an object side to an image side, a first lens with positive refractive power; a second lens with negative refractive power; a third lens; a fourth lens with positive refractive power; and a fifth lens with negative refractive power. An image-side surface of the fourth lens is convex in a paraxial region, and an object-side surface of the fifth lens is an aspheric surface having at least one inflection point.

In the imaging lens according to the present invention, the second lens with negative refractive power is arranged on the image side of the first lens with positive refractive power. This allows satisfactory correction of chromatic aberration while preferably reducing the profile of the imaging lens. In this specification of the present application, "a low profile" "reducing the profile" refers to that a ratio of a total track length, namely, a distance along the optical axis from the object-side surface of the first lens to the image plane, to a diagonal length of image plane of the image sensor is small.

The object-side surface of the fifth lens formed in an aspheric shape having at least one inflexion point allows satisfactory correction of field curvature and distortion at an image periphery while securing a back focus. The shape of the fifth lens also allows satisfactory correction of the aberrations in the paraxial and peripheral regions while controlling an incident angle of a ray of light emitted from the imaging lens into the image plane of the image sensor to be within the range of chief ray angle (CRA).

It should be noted that a "lens" in the present invention refers to an optical element having refractive power. Accordingly, the term "lens" used herein does not include optical elements such as a prism to change a direction of light travel and a flat filter. These optical elements may be arranged in front of or behind the imaging lens or between respective lenses, as necessary.

According to the imaging lens having the above-described configuration, it is preferable that the following conditional expression (1) is satisfied:

$$f/\text{Dep} < 2.0 \qquad (1)$$

where
f: a focal length of the overall optical system of the imaging lens, and
Dep: an entrance pupil diameter of the imaging lens.

To realize photographing in an environment of small light quantity, such as an evening or a twilight time or suppression of blurring of the object during photographing, it is required to brighten the image obtained from the imaging lens. In this respect, when the conditional expression (1) is satisfied, light quantity taken into the imaging lens is increased, and the bright image can be obtained through the imaging lens.

According to the imaging lens having the above-described configuration, it is preferable that the following conditional expression (2) is satisfied:

$$1.2 < T3/T2 < 1.8 \qquad (2)$$

where
T2: a thickness along the optical axis of the second lens, and
T3: a thickness along the optical axis of the third lens.

When the conditional expression (2) is satisfied, the field curvature, astigmatism, and chromatic aberration of magnification can be satisfactorily corrected within a preferable range in well balance.

According to the imaging lens having the above-described configuration, it is preferable that the following conditional expression (3) is satisfied:

$$15 < vd3 < 35 \qquad (3)$$

vd3: an abbe number at d-ray of the third lens.

When the conditional expression (3) is satisfied, an axial chromatic aberration and chromatic aberration of magnification can be satisfactorily corrected.

According to the imaging lens having the above-described configuration, it is preferable that the following conditional expression (4) is satisfied:

$$-1.0 < R5f/R5r < -0.3 \qquad (4)$$

where
R5f: a curvature radius of an object-side surface of the fifth lens, and
R5r: a curvature radius of an image-side surface of the fifth lens.

When the conditional expression (4) is satisfied, the astigmatism, the field curvature, and coma aberration can be satisfactorily corrected in well balance while securing a back focus.

According to the imaging lens having the above-described configuration, it is preferable that the following conditional expression (5) is satisfied:

$$5.0 < |f3|/f < 95.0 \quad (5)$$

where
f: a focal length of the overall optical system of the imaging lens, and
f3: a focal length of the third lens.

When the conditional expression (5) is satisfied, the field curvature and distortion can be satisfactorily corrected while reducing the profile of the imaging lens.

According to the imaging lens having the above-described configuration, it is preferable that the following conditional expression (6) is satisfied:

$$-5.0 < f23/f < -1.5 \quad (6)$$

where
f: a focal length of the overall optical system of the imaging lens, and
f23: a composite focal length of the second lens and the third lens.

When the conditional expression (6) is satisfied, the field curvature, the astigmatism, and the distortion can be satisfactorily corrected while securing a back focus.

According to the imaging lens having the above-described configuration, it is preferable that the following conditional expression (7) is satisfied:

$$0.2 < f34/f < 1.0 \quad (7)$$

where
f: a focal length of the overall optical system of the imaging lens, and
f34: a composite focal length of the third lens and the fourth lens.

When the conditional expression (7) is satisfied, the field curvature and coma aberration can be satisfactorily corrected while reducing the profile of the imaging lens.

According to the imaging lens having the above-described configuration, it is preferable that the following conditional expression (8) is satisfied:

$$0.02 < |R2r/R3f| < 1.0 \quad (8)$$

where
R2r: a curvature radius of an image-side surface of the second lens, and
R3f: a curvature radius of an object-side surface of the third lens.

When the conditional expression (8) is satisfied, the chromatic aberration of magnification, the field curvature, and the coma aberration can be satisfactorily corrected within a preferable range in well balance.

According to the imaging lens having the above-described configuration, it is preferable that the following conditional expression (9) is satisfied:

$$0.01 < D12/f < 0.08 \quad (9)$$

where
f: a focal length of the overall optical system of the imaging lens, and
D12: a distance along the optical axis between the first lens and the second lens.

When the conditional expression (9) is satisfied, the field curvature, the astigmatism, and the coma aberration can be satisfactorily corrected in well balance.

According to the imaging lens having the above-described configuration, it is preferable that the following conditional expression (10) is satisfied:

$$0.1 < D12/D23 < 0.6 \quad (10)$$

where
D12: a distance along the optical axis between the first lens and the second lens, and
D23: a distance along the optical axis between the second lens and the third lens.

When the conditional expression (10) is satisfied, the field curvature and the astigmatism can be satisfactorily corrected.

According to the imaging lens having the above-described configuration, it is preferable that the following conditional expression (11) is satisfied:

$$0.5 < D34/D23 < 2.5 \quad (11)$$

where
D23: a distance along the optical axis between the second lens and the third lens, and
D34: a distance along the optical axis between the third lens and the fourth lens.

When the conditional expression (11) is satisfied, the field curvature, the astigmatism, and the distortion can be satisfactorily corrected within a preferable range in well balance.

According to the imaging lens having the above-described configuration, it is preferable that the following conditional expression (12) is satisfied:

$$0.2 < D34/T4 < 1.5 \quad (12)$$

where
D34: a distance along the optical axis between the third lens and the fourth lens, and
T4: a thickness along the optical axis of the fourth lens.

When the conditional expression (12) is satisfied, the field curvature and astigmatism can be satisfactorily corrected while reducing the profile of the imaging lens.

According to the imaging lens having the above-described configuration, it is preferable that the following conditional expression (13) is satisfied:

$$35 < vd4 < 85 \quad (13)$$

vd4: an abbe number at d-ray of the fourth lens.

According to the imaging lens having the above-described configuration, it is preferable that the following conditional expression (14) is satisfied:

$$0.5 < Dep/ih < 0.8 \quad (14)$$

where
Dep: an entrance pupil diameter of the imaging lens, and
ih: a maximum image height of an image plane of the image sensor.

To achieve reduction in the profile more preferably, according to the imaging lens of the present invention, it is preferable that a ratio of a total track length to a diagonal length of image plane of the image sensor shown by the following conditional expression is satisfied:

$$TTL/(2 \times ih) < 1.73$$

where
TTL: a distance along the optical axis from an object-side surface of the first lens to the image plane, and
Ih: a maximum image height of an image plane of the image sensor.

Generally, an IR cut filter, a cover glass or the like are arranged between the imaging lens and the image plane, however a distance thereof along the optical axis is converted into an air-converted distance in the present specification.

According to the imaging lens of the present invention, it is preferable that each lens of the first to the fifth lenses is arranged with an air gap. When each lens is arranged with an air gap, the imaging lens according to the present invention has a lens configuration without any cemented lenses. According to such lens configuration, all of five lenses composing the imaging lens can be formed from a plastic material and it is possible to preferably reduce the manufacturing cost of the imaging lens.

According to the imaging lens of the present invention, it is preferable that both surfaces of each lens of the first to the fifth lenses are formed as aspheric surfaces. When the both surfaces of each lens are formed as aspheric surfaces, aberrations from the paraxial region to a peripheral area of the lens can be more properly corrected. Particularly, the imaging lens of the present invention is high in capacity of the aberration correction at the peripheral area of the lens due to aspheric surfaces.

According to the imaging lens of the present invention, when a field of view is shown as 2ω, it is preferable that a conditional expression, 75°≤2ω is satisfied. When the conditional expression is satisfied, a wide field of view of the imaging lens can be achieved, and reducing the profile of the imaging lens and the wide field of view can be preferably co-achieved.

In the present specification, the surface shapes of the lenses are specified using signs of the curvature radii. Whether the curvature radius of the lens is positive or negative is determined based on general definition. More specifically, taking a traveling direction of the light as positive, if a center of a curvature radius is on the image side when viewed from a lens surface, the curvature radius is positive. If a center of a curvature radius is on the object side, the curvature radius is negative. Therefore, "an object-side surface has a positive curvature radius" refers to that the object-side surface is a convex surface. "An object-side surface has a negative curvature radius" refers to that the object side surface is a concave surface. In addition, "an image-side surface has a positive curvature radius" refers to that the image-side surface is a concave surface. "An image-side surface has a negative curvature radius" refers to that the image-side surface is a convex surface. Here, a curvature radius used herein refers to a paraxial curvature radius, and may not be consistent with general shapes of the lenses in their sectional views.

According to the imaging lens of the present invention, it is achievable to provide an imaging lens which has a low F-number and is especially suitable for mounting in a small-sized camera, while having high resolution with proper correction of aberrations.

DETAILED DESCRIPTION OF EMBODIMENTS

Hereunder, referring to the accompanying drawings, an embodiment of the present invention will be fully described.

FIGS. 1, 3, 5, 7, 9, 11, 13, 15, 17, 19 and 21 are schematic sectional views of the imaging lenses in Examples 1 to 11 according to the embodiment, respectively. Since the imaging lenses in those Examples have the same basic configuration, the imaging lens according to the present embodiments will be described with reference to the illustrative sectional view of Example 1.

Figure 1:
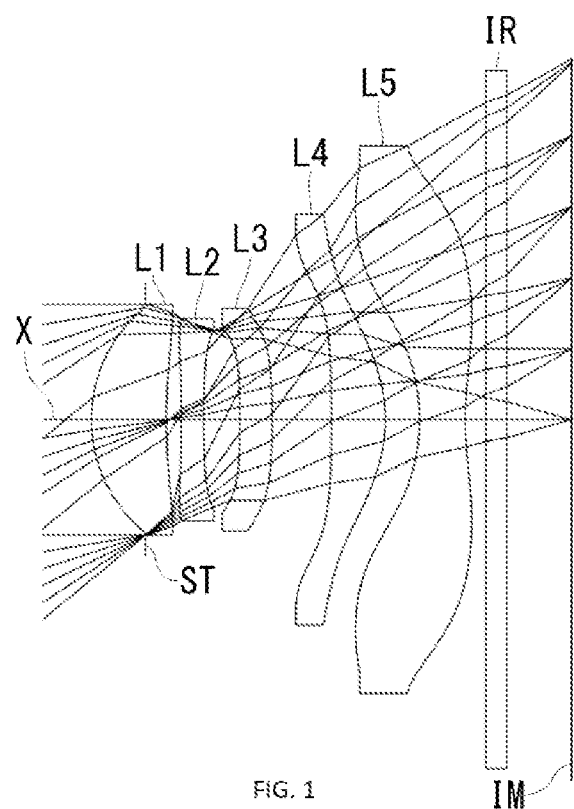
FIG. 1 is a sectional view of a schematic configuration of an imaging lens in Example 1 of the present invention.

As shown in FIG. 1, the imaging lens according to the present embodiment comprises, in order from an object side to an image side, a first lens L1 with positive refractive power, a second lens L2 with negative refractive power, a third lens L3, a fourth lens L4 with positive refractive power, and a fifth lens L5 with negative refractive power. Each lens of the first lens L1 to the fifth lens L5 is arranged with an air gap. A filter IR is arranged between the fifth lens L5 and an image plane IM of the image sensor. The filter IR is omissible. Unless specifically mentioned in the present specification, refractive power of each lens refers to refractive power in the paraxial region.

The first lens L1 has a shape that a curvature radius r2 of an object-side surface and a curvature radius r3 of an image-side surface of the first lens are both positive. The first lens L1 is formed in a meniscus shape having an object-side surface being convex in the paraxial region. The shape of the first lens L1 is not limited to the one in the Example 1. The shape of the first lens L1 may be formed in any shape, if the refractive power of the first lens L1 is positive. For example, as a shape of the first lens L1, the first lens L1 may be formed in a shape which the curvature radius r2 is positive and the curvature radius r3 is negative, namely a shape of a biconvex lens in the paraxial region.

The second lens L2 has a shape that a curvature radius r4 of an object-side surface is negative and a curvature radius r5 (=R2r) of an image-side surface is positive. The second lens L2 is formed in a biconcave shape in the paraxial region. The shape of the second lens L2 is not limited to the one in the Example 1. The shape of the second lens L2 may be formed in any shape, if the refractive power of the second lens L2 is negative. The second lens L2 in the Examples 4, 5, 7-9 is formed in a meniscus shape having the object-side surface being convex in the paraxial region. As the other shape of the second lens L2, the second lens L2 may be formed in a meniscus shape that curvature radii r4 and r5 are both negative, and the object-side surface is concave in the paraxial region. It is preferable that the curvature radius r4 of the second lens L2 is positive from the standpoint of reducing a profile of the imaging lens.

The third lens L3 has the positive refractive power. The refractive power of the third lens L3 is not limited to positive. The imaging lens in the Examples 4-9 is a lens configuration having negative refractive power of the third lens L3.

The third lens L3 has a shape that a curvature radius r6 (=R3f) of an object-side surface and a curvature radius r7 of an image-side surface are both negative. The third lens L3 is formed in a meniscus shape having the object-side surface being concave in a paraxial region. The shape of the third lens L3 is not limited to the one in the Example 1. The third lens L3 in the Examples 5, 7 and 8 is formed in a biconcave shape in the paraxial region. The third lens L3 in the Example 10 is formed in a meniscus shape having the object-side surface being convex, and the third lens L3 in the Example 11 is formed in a biconvex shape.

The fourth lens L4 has a shape that a curvature radius r8 of an object-side surface and a curvature radius r9 of an image-side surface are both negative. The fourth lens L4 is formed in a meniscus shape having the object-side surface being concave in a paraxial region. The shape of the fourth lens L4 is not limited to the one in the Example 1, if the image-side surface is convex in the paraxial region. The fourth lens L4 in the Example 6 is formed in the biconvex shape in the paraxial region.

The fifth lens L5 has a shape that a curvature radius r10 (=R5f) of an object-side surface is negative and a curvature radius r11 (=5Rr) of an image-side surface is positive. The fifth lens L5 is formed in a biconcave shape in a paraxial region. The shape of the fifth lens L5 is not limited to the one in the Example 1. As a shape of the fifth lens L5, the fifth lens L5 may be formed in a meniscus shape having the object-side surface being convex in the paraxial region, or a meniscus shape having the object-side surface being concave in the paraxial region. It is preferable that the curvature radius r11 of the image-side surface of the fifth lens L5 is positive, namely the image-side surface is concave from the standpoint of reducing the profile of the imaging lens and securing a back focus.

Both sides of the fifth lens L5 are formed as aspheric surfaces having at least one inflexion point. Here, the "inflection point" refers to a point where the positive/negative sign of a curvature changes on the curve, i.e., a point where a direction of curving of the curve on the lens surface changes. The image-side surface of the fifth lens L5 of the imaging lens according to the present embodiments is the aspheric surface having at least one pole point. With such a shape of the fifth lens L5, an off-axial chromatic aberration of magnification as well as an axial chromatic aberration can be satisfactorily corrected, and an incident angle of a light ray emitted from the imaging lens to the image plane IM can be appropriately controlled to be within the range of chief ray angle (CRA). Depending on the required optical performance and extent of reducing the profile of the imaging lens, the image-side surface of the fifth lens L5 may be formed as an aspheric surface without the inflection point.

According to the present embodiments, the imaging lens satisfies the following conditional expressions (1) to (14):

$$f/\text{Dep} < 2.0 \quad (1)$$

$$1.2 < T3/T2 < 1.8 \quad (2)$$

$$15 < vd3 < 35 \quad (3)$$

$$-1.0 < R5f/R5r < -0.3 \quad (4)$$

$$5.0 < |f3|/f < 95.0 \quad (5)$$

$$-5.0 < f23/f < -1.5 \quad (6)$$

$$0.2 < f34/f < 1.0 \quad (7)$$

$$0.02 < |R2r/R3f| < 1.0 \quad (8)$$

$$0.01 < D12/f < 0.08 \quad (9)$$

$$0.1 < D12/D23 < 0.6 \quad (10)$$

$$0.5 < D34/D23 < 2.5 \quad (11)$$

$$0.2 < D34/T4 < 1.5 \quad (12)$$

$$35 < vd4 < 85 \quad (13)$$

$$0.5 < \text{Dep}/ih < 0.8 \quad (14)$$

where
f: a focal length of the overall optical system of the imaging lens,
Dep: an entrance pupil diameter of the imaging lens,
f3: a focal length of the third lens L3,
f23: a composite focal length of the second lens L2 and the third lens L3,
f34: a composite focal length of the third lens L3 and the fourth lens L4,
T2: a thickness along the optical axis X of the second lens L2,
T3: a thickness along the optical axis X of the third lens L3,
T4: a thickness along the optical axis X of the fourth lens L4,
vd3: an abbe number at d-ray of the third lens L3,
vd4: an abbe number at d-ray of the fourth lens L4,
R2r: a curvature radius of an image-side surface of the second lens L2, R3f: a curvature radius of an object-side surface of the third lens L3, R5f: a curvature radius of an object-side surface of the fifth lens L5, R5r: a curvature radius of an image-side surface of the fifth lens L5, D12: a distance along the optical axis X between the first lens L1 and the second lens L2, D23: a distance along the optical axis X between the second lens L2 and the third lens L3, D34: a distance along the optical axis X between the third lens L3 and the fourth lens L4, and ih: a maximum image height of an image plane IM of the image sensor.

The imaging lens according to the present embodiments satisfies a ratio of a total track length to a diagonal length of image plane of the image sensor shown by the following conditional expression:

$$TTL/(2 \times ih) < 1.73$$

where

TTL: a distance along the optical axis X from an object-side surface of the first lens L1 to the image plane IM.

Furthermore, the imaging lens according to the present embodiments satisfies the following conditional expression:

$$75° \leq 2\omega$$

where

ω: a half field of view.

It is not necessary to satisfy the above all conditional expressions, and when any one of the conditional expressions is individually satisfied, operational advantage corresponding to each conditional expression can be obtained.

The imaging lens according to the present embodiments satisfies the following conditional expressions (6a) to (8a), (10a) to (12a), and (14a), and more preferable effects can be obtained.

$$-3.0 < f23/f < -1.2 \tag{6a}$$

$$0.4 < f34/f < 0.8 \tag{7a}$$

$$0.02 < |R2r/R3f| < 0.8 \tag{8a}$$

$$0.2 < D12/D23 < 0.5 \tag{10a}$$

$$0.7 < D34/D23 < 2.2 \tag{11a}$$

$$0.4 < D34/T4 < 1.3 \tag{12a}$$

$$0.6 < Dep/ih < 0.8 \tag{14a}$$

Regarding these conditional expressions (6a) to (14a), only lower limits or upper limits thereof may be applied to the lower limits or the upper limits of corresponding conditional expressions (6) to (14), respectively.

According to the present embodiments, a lens surface of each of the respective lenses is formed as the aspheric surface. An equation that expresses these aspheric surfaces is shown below:

$$Z = \frac{C \cdot H^2}{1 + \sqrt{1 - (1+k) \cdot C^2 \cdot H^2}} + \sum (An \cdot H^n) \qquad \text{[Equation 1]}$$

where

Z: a distance in a direction of the optical axis,

H: a distance from the optical axis in a direction perpendicular to the optical axis, C: a paraxial curvature (=1/r, r: a paraxial curvature radius), k: conic constant, and An: the nth aspheric coefficient.

Next, examples of the imaging lens according to the present embodiments will be described. In each example, f represents a focal length of the overall optical system of the imaging lens, Fno represents an F-number, ω represents a half field of view, ih represents a maximum image height of an image plane IM, and TTL represents a distance along the optical axis from an object-side surface of the first lens L1 to the image plane IM. Additionally, i represents a surface number counted from the object side, r represents a paraxial curvature radius, d represents a distance of lenses along the optical axis (surface distance), nd represents a refractive index at a reference wavelength of 588 nm, and vd represents an abbe number at the reference wavelength, respectively. Here, surfaces indicated with surface numbers i affixed with an asterisk (*) are aspheric surfaces.

Example 1

The basic lens data:

| Example 1 | | | | | |
|---|---|---|---|---|---|
| Unit mm | | | | | |
| f = | | | 4.274 | | |
| Fno = | | | 1.85 | | |
| ω (°) = | | | 39.3 | | |
| ih = | | | 3.5 | | |
| TTL = | | | 4.74 | | |
| Surface Data | | | | | |
| i | r | d | nd | vd | |
| (Object) | Infinity | Infinity | | | |
| (Stop) | Infinity | −0.545 | | | |
| 2* | 1.466 | 0.750 | 1.544 | 55.86 | (ν d1) |
| 3* | 5.510 | 0.148 | | | |
| 4* | −15.720 | 0.225 | 1.671 | 19.24 | (ν d2) |
| 5* | 9.493 | 0.362 | | | |
| 6* | −27.289 | 0.321 | 1.661 | 20.37 | (ν d3) |
| 7* | −18.123 | 0.596 | | | |
| 8* | −19.430 | 0.539 | 1.544 | 55.86 | (ν d4) |
| 9* | −1.463 | 0.341 | | | |

-continued

Example 1

| | | | | | |
|---|---|---|---|---|---|
| 10* | −2.028 | 0.455 | 1.535 | 55.66 | (ν d5) |
| 11* | 2.875 | 0.210 | | | |
| 12 | Infinity | 0.210 | 1.517 | 64.20 | |
| 13 | Infinity | 0.652 | | | |
| Image Plane | | | | | |

Constituent Lens Data

| Lens | Start Surface | Focal Length | TTL to diagonal length of image plane |
|---|---|---|---|
| L1 | 2 | 3.445 | 0.68 |
| L2 | 4 | −8.793 | |
| L3 | 6 | 80.531 | |
| L4 | 8 | 2.876 | |
| L5 | 10 | −2.154 | |

Aspheric Surface Data

| | 2nd Surface | 3rd Surface | 4th Surface | 5th Surface | 6th Surface |
|---|---|---|---|---|---|
| k | 0.000000E+00 | 0.000000E+00 | 0.000000E+00 | 0.000000E+00 | 0.000000E+00 |
| A4 | −1.118769E−02 | −3.452014E−02 | −4.470763E−02 | −7.704417E−03 | −2.043532E−01 |
| A6 | 1.187489E−01 | 4.933946E−03 | 1.317855E−01 | 2.019462E−01 | 4.420137E−01 |
| A8 | −5.308961E−01 | −4.605299E−02 | −2.468149E−01 | −6.708958E−01 | −3.358106E+00 |
| A10 | 1.476282E+00 | 4.832851E−01 | 1.124533E+00 | 3.111690E+00 | 1.452921E+01 |
| A12 | −2.568369E+00 | −1.651181E+00 | −3.416814E+00 | −8.876203E+00 | −3.994420E+01 |
| A14 | 2.823631E+00 | 2.873196E+00 | 5.906511E+00 | 1.510041E+01 | 6.959468E+01 |
| A16 | −1.903881E+00 | −2.764575E+00 | −5.827141E+00 | −1.495542E+01 | −7.465816E+01 |
| A18 | 7.202280E−01 | 1.394910E+00 | 3.074704E+00 | 7.928909E+00 | 4.495384E+01 |
| A20 | −1.179287E−01 | −2.883417E−01 | −6.719011E−01 | −1.687893E+00 | −1.161108E+01 |

| | 7th Surface | 8th Surface | 9th Surface | 10th Surface | 11th Surface |
|---|---|---|---|---|---|
| k | 0.000000E+00 | 0.000000E+00 | −1.000000E+00 | −1.000000E+00 | −1.000000E+00 |
| A4 | −1.584717E−01 | −1.810288E−02 | 9.423165E−02 | −4.614271E−02 | −1.774167E−01 |
| A6 | 2.322603E−01 | 7.885106E−03 | −6.600568E−02 | −2.849844E−02 | 1.087583E−01 |
| A8 | −1.243234E+00 | −9.169573E−02 | −1.826905E−03 | 7.325155E−02 | −5.330654E−02 |
| A10 | 3.751035E+00 | 1.467681E−01 | 6.112304E−02 | −4.131110E−02 | 1.893405E−02 |
| A12 | −7.127744E+00 | −1.254323E−01 | −4.949416E−02 | 1.210421E−02 | −4.720250E−03 |
| A14 | 8.572077E+00 | 6.240582E−02 | 1.875416E−02 | −2.109388E−03 | 7.891104E−04 |
| A16 | −6.323776E+00 | −1.771736E−02 | −3.885754E−03 | 2.210298E−04 | −8.338963E−05 |
| A18 | 2.614529E+00 | 2.660185E−03 | 4.279096E−04 | −1.290097E−05 | 5.021985E−06 |
| A20 | −4.611715E−01 | −1.643625E−04 | −1.974647E−05 | 3.226905E−07 | −1.312295E−07 |

Figure 2:
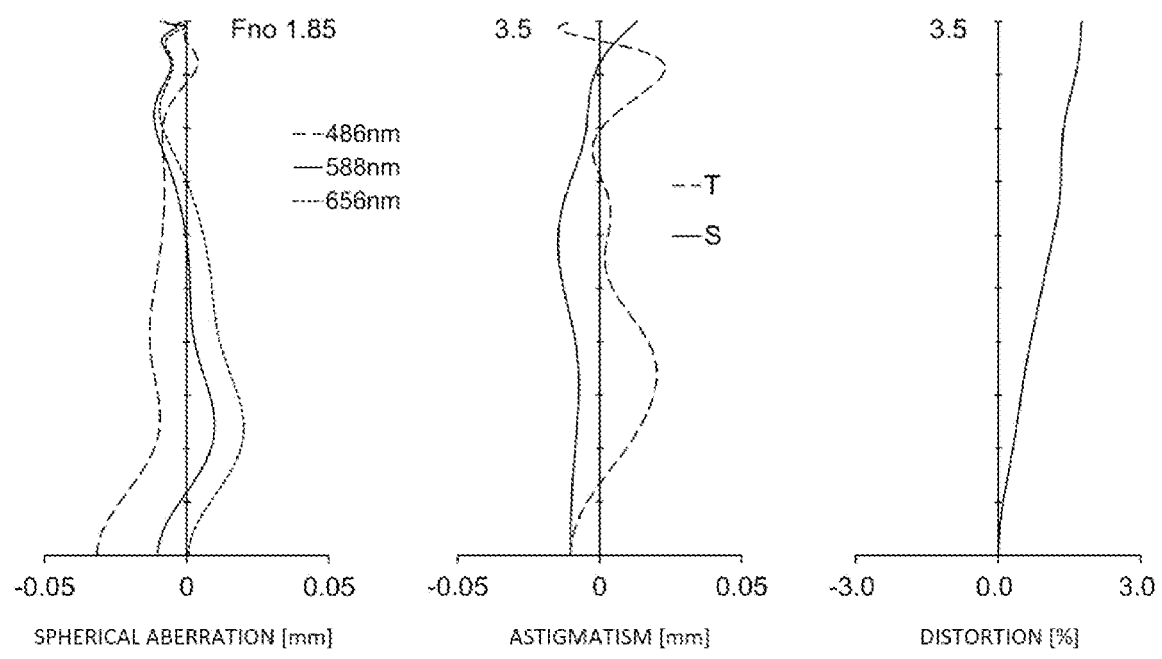
FIG. 2 is an aberration diagram showing spherical aberration, astigmatism, and distortion of the imaging lens of FIG. 1.
Figure 3:
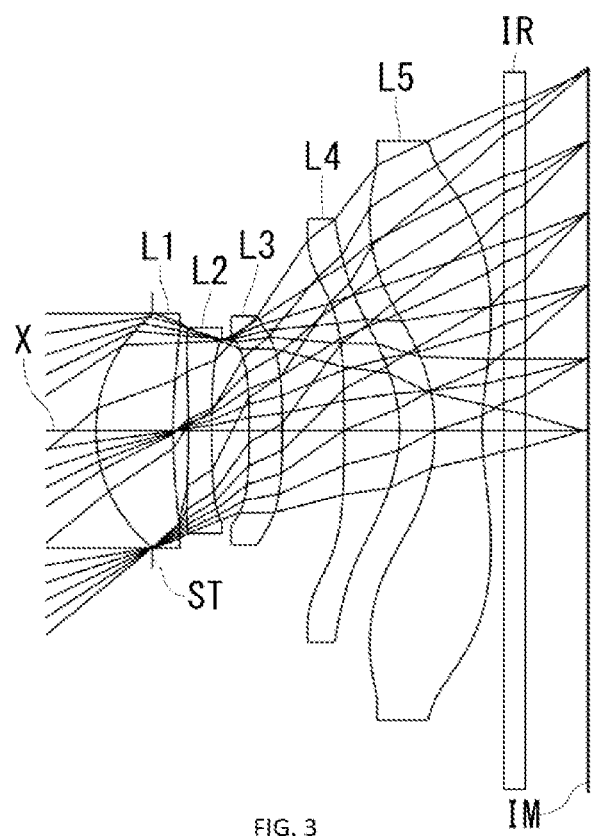
FIG. 3 is a sectional view of a schematic configuration of an imaging lens in Example 2 of the present invention.

FIG. 2 shows spherical aberration (mm), astigmatism (mm), and distortion (%) of the imaging lens, respectively. The astigmatism diagram and the distortion diagram show aberrations at the reference wavelength (588 nm). Furthermore, in the astigmatism diagram, a sagittal image surface (S) and a tangential image surface (T) are shown respectively (same for FIGS. 4, 6, 8, 10, 12, 14, 16, 18, 20, and 22).

As shown in FIG. 2, according to the imaging lens of the Example 1, aberrations can be properly corrected.

Example 2

The basic lens data:

Example 2

Unit mm

| | |
|---|---|
| f = | 4.264 |
| Fno = | 1.86 |
| ω (°) = | 39.4 |
| ih = | 3.5 |
| TTL = | 4.73 |

Surface Data

| i | r | d | nd | ν d | |
|---|---|---|---|---|---|
| (Object) | Infinity | Infinity | | | |
| (Stop) | Infinity | −0.545 | | | |
| 2* | 1.466 | 0.751 | 1.544 | 55.86 | (ν d1) |
| 3* | 5.504 | 0.149 | | | |
| 4* | −15.850 | 0.226 | 1.671 | 19.24 | (ν d2) |
| 5* | 9.532 | 0.365 | | | |
| 6* | −27.395 | 0.323 | 1.661 | 20.37 | (ν d3) |

-continued

| Example 2 | | | | | |
|---|---|---|---|---|---|
| 7* | −18.067 | 0.604 | | | |
| 8* | −20.049 | 0.541 | 1.544 | 55.86 | (ν d4) |
| 9* | −1.449 | 0.340 | | | |
| 10* | −2.045 | 0.464 | 1.535 | 55.66 | (ν d5) |
| 11* | 2.644 | 0.211 | | | |
| 12 | Infinity | 0.210 | 1.517 | 64.20 | |
| 13 | Infinity | 0.618 | | | |
| Image Plane | | | | | |

Constituent Lens Data

| Lens | Start Surface | Focal Length | TTL to diagonal length of image plane |
|---|---|---|---|
| L1 | 2 | 3.445 | 0.68 |
| L2 | 4 | −8.843 | |
| L3 | 6 | 79.214 | |
| L4 | 8 | 2.841 | |
| L5 | 10 | −2.084 | |

Aspheric Surface Data

| | 2nd Surface | 3rd Surface | 4th Surface | 5th Surface | 6th Surface |
|---|---|---|---|---|---|
| k | 0.000000E+00 | 0.000000E+00 | 0.000000E+00 | 0.000000E+00 | 0.000000E+00 |
| A4 | −1.130964E−02 | −3.452705E−02 | −4.488250E−02 | −7.619544E−03 | −2.043150E−01 |
| A6 | 1.187340E−01 | 5.041619E−03 | 1.316918E−01 | 2.020175E−01 | 4.420076E−01 |
| A8 | −5.309420E−01 | −4.603990E−02 | −2.468547E−01 | −6.710898E−01 | −3.358468E+00 |
| A10 | 1.476195E+00 | 4.833620E−01 | 1.124742E+00 | 3.111542E+00 | 1.452912E+01 |
| A12 | −2.568355E+00 | −1.651061E+00 | −3.416906E+00 | −8.876021E+00 | −3.994444E+01 |
| A14 | 2.823631E+00 | 2.873229E+00 | 5.906283E+00 | 1.510050E+01 | 6.959449E+01 |
| A16 | −1.903891E+00 | −2.764667E+00 | −5.827420E+00 | −1.495469E+01 | −7.465817E+01 |
| A18 | 7.202267E−01 | 1.394727E+00 | 3.074395E+00 | 7.931037E+00 | 4.495577E+01 |
| A20 | −1.179292E−01 | −2.886347E−01 | −6.721949E−01 | −1.691421E+00 | −1.161010E+01 |

| | 7th Surface | 8th Surface | 9th Surface | 10th Surface | 11th Surface |
|---|---|---|---|---|---|
| k | 0.000000E+00 | 0.000000E+00 | −1.000000E+00 | −1.000000E+00 | −1.000000E+00 |
| A4 | −1.585789E−01 | −1.795946E−02 | 9.413801E−02 | −4.618422E−02 | −1.778792E−01 |
| A6 | 2.320799E−01 | 7.862906E−03 | −6.600858E−02 | −2.847124E−02 | 1.087240E−01 |
| A8 | −1.243246E+00 | −9.172836E−02 | −1.831969E−03 | 7.325058E−02 | −5.330554E−02 |
| A10 | 3.750993E+00 | 1.467607E−01 | 6.112359E−02 | −4.131142E−02 | 1.893389E−02 |
| A12 | −7.127799E+00 | −1.254341E−01 | −4.949421E−02 | 1.210423E−02 | −4.720217E−03 |
| A14 | 8.571962E+00 | 6.240548E−02 | 1.875437E−02 | −2.109361E−03 | 7.891129E−04 |
| A16 | −6.323784E+00 | −1.771741E−02 | −3.885749E−03 | 2.210331E−04 | −8.339010E−05 |
| A18 | 2.614447E+00 | 2.660421E−03 | 4.279239E−04 | −1.290183E−05 | 5.021951E−06 |
| A20 | −4.611394E−01 | −1.643793E−04 | −1.974803E−05 | 3.226966E−07 | −1.312304E−07 |

Figure 4:
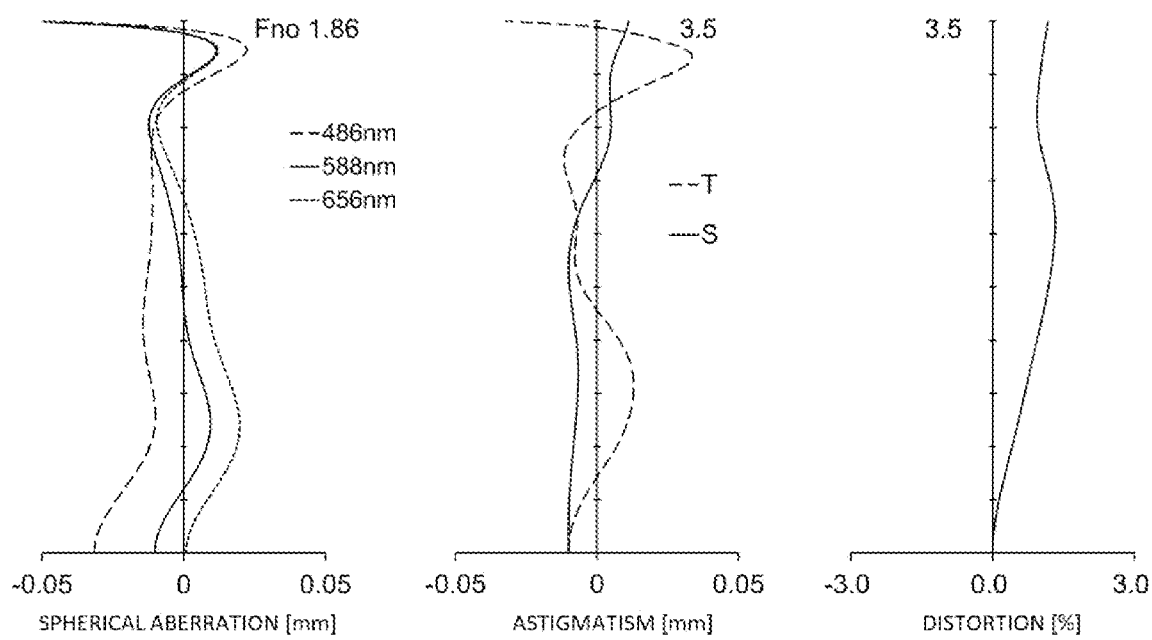
FIG. 4 is an aberration diagram showing spherical aberration, astigmatism, and distortion of the imaging lens of FIG. 3.
Figure 5:
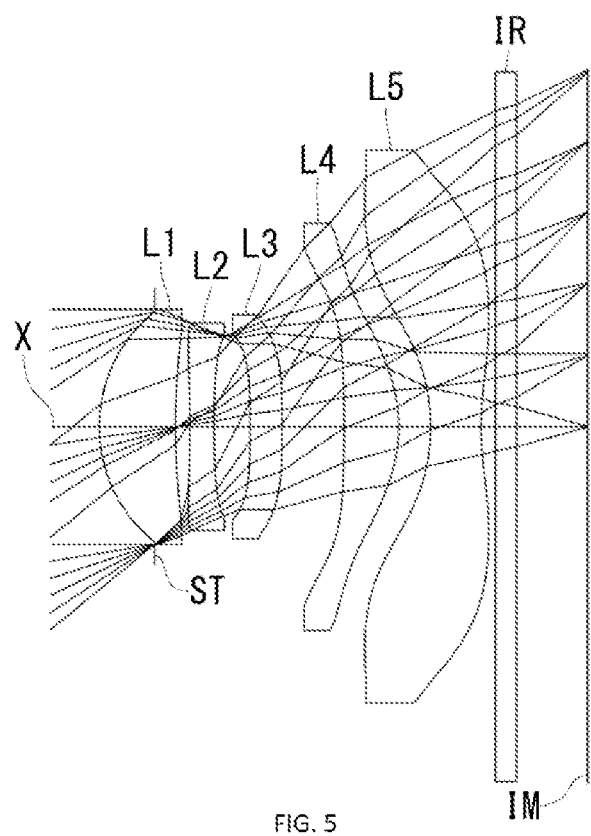
FIG. 5 is a sectional view of a schematic configuration of an imaging lens in Example 3 of the present invention.

As shown in FIG. 4, according to the imaging lens of the Example 2, aberrations can be also properly corrected.

Example 3

The basic lens data:

| Example 3 |
|---|
| Unit mm |

| f = | 4.272 |
|---|---|
| Fno = | 1.84 |
| ω (°) = | 39.3 |
| ih = | 3.5 |
| TTL = | 4.74 |

Surface Data

| i | r | d | nd | ν d | |
|---|---|---|---|---|---|
| (Object) | Infinity | Infinity | | | |
| (Stop) | Infinity | −0.545 | | | |
| 2* | 1.467 | 0.748 | 1.544 | 55.86 | (ν d1) |
| 3* | 5.529 | 0.146 | | | |
| 4* | −15.799 | 0.237 | 1.671 | 19.24 | (ν d2) |

-continued

Example 3

| | | | | | |
|---|---|---|---|---|---|
| 5* | 9.527 | 0.354 | | | |
| 6* | −29.307 | 0.317 | 1.661 | 20.37 | (ν d3) |
| 7* | −17.577 | 0.610 | | | |
| 8* | −18.962 | 0.540 | 1.544 | 55.86 | (ν d4) |
| 9* | −1.432 | 0.312 | | | |
| 10* | −2.026 | 0.497 | 1.535 | 55.66 | (ν d5) |
| 11* | 2.688 | 0.142 | | | |
| 12 | Infinity | 0.210 | 1.517 | 64.20 | |
| 13 | Infinity | 0.700 | | | |
| Image Plane | | | | | |

Constituent Lens Data

| Lens | Start Surface | Focal Length | TTL to diagonal length of image plane |
|---|---|---|---|
| L1 | 2 | 3.445 | 0.68 |
| L2 | 4 | −8.827 | |
| L3 | 6 | 65.760 | |
| L4 | 8 | 2.816 | |
| L5 | 10 | −2.083 | |

Aspheric Surface Data

| | 2nd Surface | 3rd Surface | 4th Surface | 5th Surface | 6th Surface |
|---|---|---|---|---|---|
| k | 0.000000E+00 | 0.000000E+00 | 0.000000E+00 | 0.000000E+00 | 0.000000E+00 |
| A4 | −1.140346E−02 | −3.498746E−02 | −4.481259E−02 | −8.292446E−03 | −2.045406E−01 |
| A6 | 1.186817E−01 | 5.837705E−03 | 1.315865E−01 | 2.026227E−01 | 4.417673E−01 |
| A8 | −5.309808E−01 | −4.601394E−02 | −2.468467E−01 | −6.711327E−01 | −3.359191E+00 |
| A10 | 1.475722E+00 | 4.829666E−01 | 1.125311E+00 | 3.111766E+00 | 1.453115E+01 |
| A12 | −2.568386E+00 | −1.650990E+00 | −3.416790E+00 | −8.875187E+00 | −3.994279E+01 |
| A14 | 2.823610E+00 | 2.873263E+00 | 5.906535E+00 | 1.509953E+01 | 6.959510E+01 |
| A16 | −1.903862E+00 | −2.764598E+00 | −5.827232E+00 | −1.495903E+01 | −7.465707E+01 |
| A18 | 7.202271E−01 | 1.394840E+00 | 3.074437E+00 | 7.930160E+00 | 4.495283E+01 |
| A20 | −1.179261E−01 | −2.884919E−01 | −6.723073E−01 | −1.686139E+00 | −1.161161E+01 |

| | 7th Surface | 8th Surface | 9th Surface | 10th Surface | 11th Surface |
|---|---|---|---|---|---|
| k | 0.000000E+00 | 0.000000E+00 | −1.000000E+00 | −1.000000E+00 | −1.000000E+00 |
| A4 | −1.586726E−01 | −1.855588E−02 | 9.414362E−02 | −4.605496E−02 | −1.794577E−01 |
| A6 | 2.323149E−01 | 7.763015E−03 | −6.600795E−02 | −2.849873E−02 | 1.087147E−01 |
| A8 | −1.243663E+00 | −9.181633E−02 | −1.812334E−03 | 7.323829E−02 | −5.330073E−02 |
| A10 | 3.750440E+00 | 1.467397E−01 | 6.110965E−02 | −4.131197E−02 | 1.893273E−02 |
| A12 | −7.127468E+00 | −1.254364E−01 | −4.949007E−02 | 1.210400E−02 | −4.720171E−03 |
| A14 | 8.572250E+00 | 6.240494E−02 | 1.875408E−02 | −2.109342E−03 | 7.890969E−04 |
| A16 | −6.323738E+00 | −1.771814E−02 | −3.885658E−03 | 2.210370E−04 | −8.339140E−05 |
| A18 | 2.613990E+00 | 2.660259E−03 | 4.278686E−04 | −1.290267E−05 | 5.021851E−06 |
| A20 | −4.607781E−01 | −1.644730E−04 | −1.977959E−05 | 3.226734E−07 | −1.312256E−07 |

Figure 6:
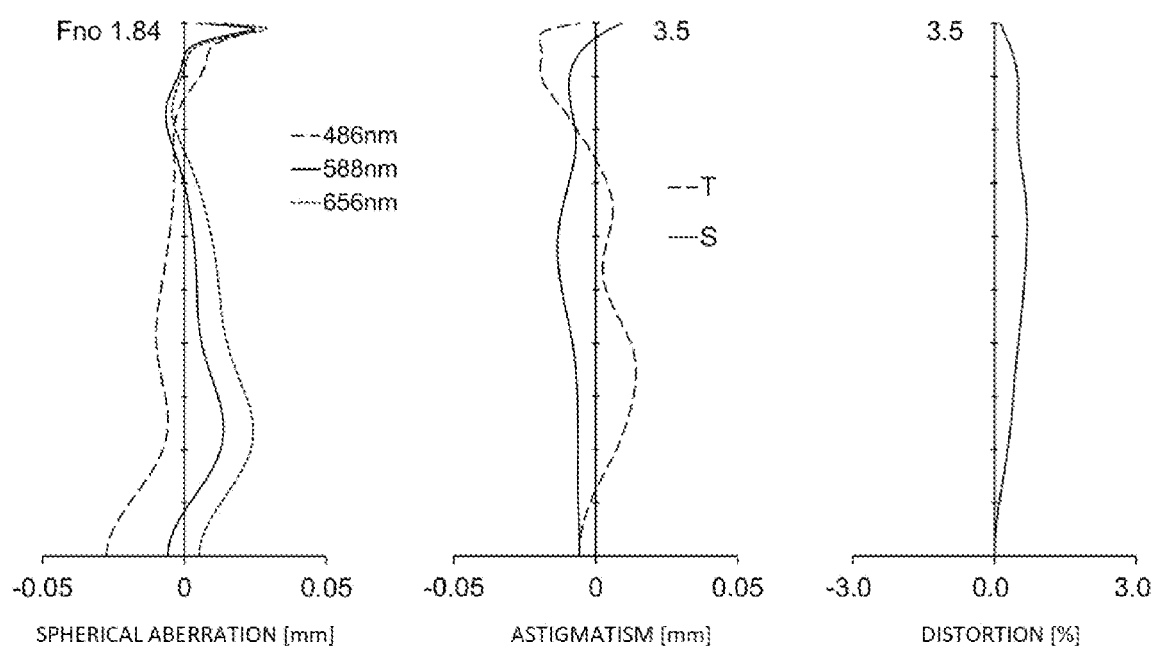
FIG. 6 is an aberration diagram showing spherical aberration, astigmatism, and distortion of the imaging lens of FIG. 5.
Figure 7:
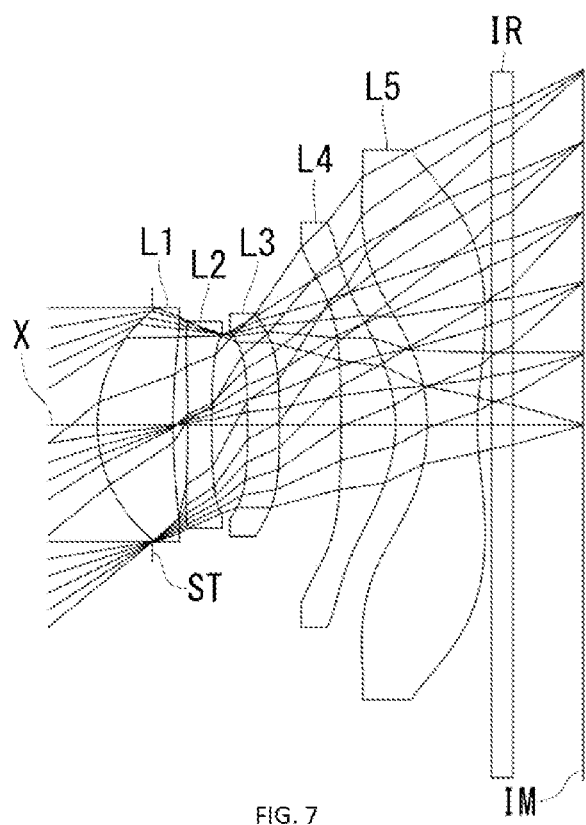
FIG. 7 is a sectional view of a schematic configuration of an imaging lens in Example 4 of the present invention.

As shown in FIG. 6, according to the imaging lens of the Example 3, aberrations can be also properly corrected.

Example 4

The basic lens data:

Example 4

Unit mm

| | |
|---|---|
| f = | 4.260 |
| Fno = | 1.86 |
| ω (°) = | 39.4 |
| ih = | 3.5 |
| TTL = | 4.84 |

Surface Data

| i | r | d | nd | ν d | |
|---|---|---|---|---|---|
| (Object) | Infinity | Infinity | | | |
| (Stop) | Infinity | −0.556 | | | |
| 2* | 1.471 | 0.732 | 1.544 | 55.86 | (ν d1) |

-continued

| Example 4 | | | | | |
|---|---|---|---|---|---|
| 3* | 5.202 | 0.147 | | | |
| 4* | 553.771 | 0.225 | 1.671 | 19.24 | (ν d2) |
| 5* | 6.816 | 0.438 | | | |
| 6* | −13.878 | 0.346 | 1.671 | 19.24 | (ν d3) |
| 7* | −19.955 | 0.432 | | | |
| 8* | −23.484 | 0.738 | 1.544 | 55.86 | (ν d4) |
| 9* | −1.279 | 0.338 | | | |
| 10* | −1.605 | 0.415 | 1.535 | 55.66 | (ν d5) |
| 11* | 3.512 | 0.210 | | | |
| 12 | Infinity | 0.210 | 1.517 | 64.20 | |
| 13 | Infinity | 0.677 | | | |
| Image Plane | | | | | |

| Constituent Lens Data | | | |
|---|---|---|---|
| Lens | Start Surface | Focal Length | TTL to diagonal length of image plane |
| L1 | 2 | 3.524 | 0.69 |
| L2 | 4 | −10.290 | |
| L3 | 6 | −69.534 | |
| L4 | 8 | 2.457 | |
| L5 | 10 | −2.003 | |

| Aspheric Surface Data | | | | | |
|---|---|---|---|---|---|
| | 2nd Surface | 3rd Surface | 4th Surface | 5th Surface | 6th Surface |
| k | 0.000000E+00 | 0.000000E+00 | 0.000000E+00 | 0.000000E+00 | 0.000000E+00 |
| A4 | −4.381812E−03 | −1.099918E−02 | −4.328709E−02 | 1.732355E−03 | −1.653088E−01 |
| A6 | 5.765772E−02 | −1.808261E−01 | 1.940475E−01 | 2.613879E−01 | 3.086153E−01 |
| A8 | −1.972800E−01 | 1.127390E+00 | −8.935158E−01 | −1.439757E+00 | −2.222604E+00 |
| A10 | 4.554310E−01 | −3.867834E+00 | 3.551000E+00 | 6.856671E+00 | 9.461558E+00 |
| A12 | −6.802871E−01 | 8.086639E+00 | −8.644077E+00 | −1.969342E+01 | −2.526565E+01 |
| A14 | 6.780599E−01 | −1.047767E+01 | 1.280054E+01 | 3.469877E+01 | 4.200804E+01 |
| A16 | −4.355871E−01 | 8.217439E+00 | −1.128807E+01 | −3.654332E+01 | −4.237435E+01 |
| A18 | 1.643625E−01 | −3.576723E+00 | 5.446073E+00 | 2.108858E+01 | 2.381427E+01 |
| A20 | −2.784149E−02 | 6.630790E−01 | −1.105062E+00 | −5.087722E+00 | −5.741999E+00 |
| | 7th Surface | 8th Surface | 9th Surface | 10th Surface | 11th Surface |
| k | 0.000000E+00 | 0.000000E+00 | −1.046219E+00 | −1.000000E+00 | −1.000000E+00 |
| A4 | −1.301766E−01 | −4.714696E−02 | 1.124975E−01 | 1.123706E−01 | −8.511545E−02 |
| A6 | 4.206976E−02 | 3.470916E−02 | −4.777791E−02 | −1.135304E−01 | 3.261934E−02 |
| A8 | 4.281050E−02 | −3.316136E−02 | 3.199954E−03 | 7.969114E−02 | −1.192630E−02 |
| A10 | −5.052083E−01 | 1.381722E−02 | 2.669585E−02 | −3.080850E−02 | 3.482315E−03 |
| A12 | 1.230967E+00 | −1.116269E−04 | −2.057984E−02 | 7.211205E−03 | −7.569662E−04 |
| A14 | −1.530364E+00 | −1.420732E−03 | 7.089277E−03 | −1.062682E−03 | 1.128657E−04 |
| A16 | 1.067653E+00 | 4.012411E−04 | −1.301599E−03 | 9.708615E−05 | −1.056473E−05 |
| A18 | −3.908750E−01 | −4.448936E−05 | 1.241886E−04 | −5.048170E−06 | 5.541743E−07 |
| A20 | 5.794489E−02 | 1.752906E−06 | −4.859828E−06 | 1.145462E−07 | −1.243632E−08 |

Figure 8:
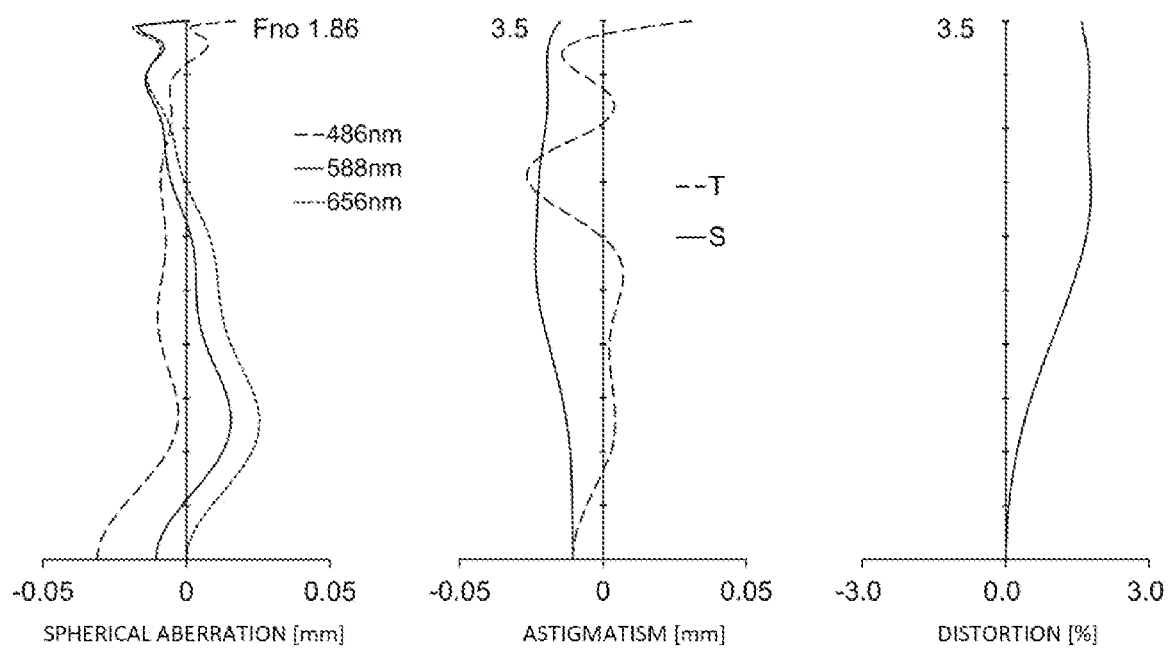
FIG. 8 is an aberration diagram showing spherical aberration, astigmatism, and distortion of the imaging lens of FIG. 7.
Figure 9:
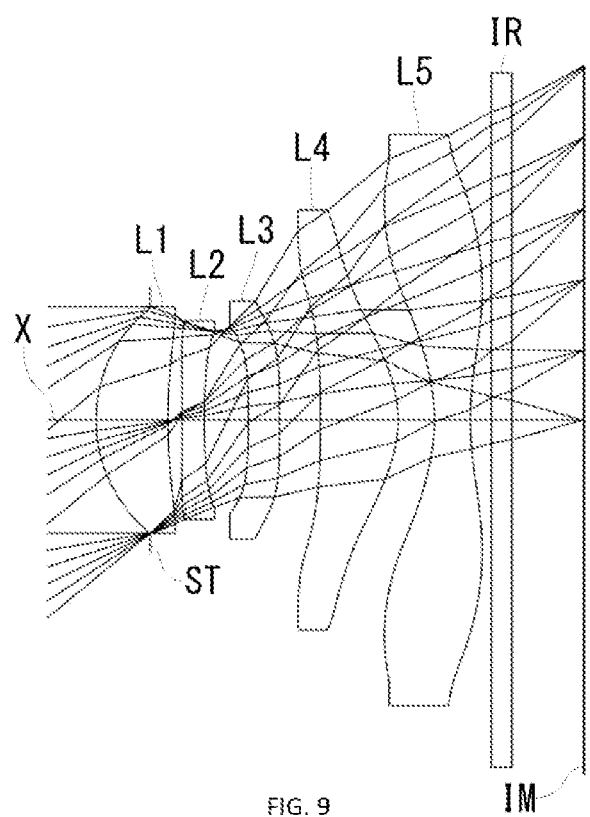
FIG. 9 is a sectional view of a schematic configuration of an imaging lens in Example 5 of the present invention.

As shown in FIG. 8, according to the imaging lens of the Example 4, aberrations can be also properly corrected.

Example 5

The basic lens data:

| Example 5 |  |
|---|---|
| Unit mm | |
| f = | 4.259 |
| Fno = | 1.86 |
| ω (°) = | 39.4 |
| ih = | 3.5 |
| TTL = | 4.85 |

-continued

Example 5

Surface Data

| i | r | d | nd | ν d | |
|---|---|---|---|---|---|
| (Object) | Infinity | Infinity | | | |
| (Stop) | Infinity | −0.544 | | | |
| 2* | 1.479 | 0.723 | 1.544 | 55.86 | (ν d1) |
| 3* | 5.083 | 0.146 | | | |
| 4* | 112.394 | 0.222 | 1.671 | 19.24 | (ν d2) |
| 5* | 6.728 | 0.442 | | | |
| 6* | −25.842 | 0.315 | 1.671 | 19.24 | (ν d3) |
| 7* | 1597.030 | 0.413 | | | |
| 8* | −13.024 | 0.783 | 1.544 | 55.86 | (ν d4) |
| 9* | −1.208 | 0.366 | | | |
| 10* | −1.828 | 0.360 | 1.535 | 55.66 | (ν d5) |
| 11* | 2.887 | 0.210 | | | |
| 12 | Infinity | 0.210 | 1.517 | 64.20 | |
| 13 | Infinity | 0.731 | | | |
| Image Plane | | | | | |

Constituent Lens Data

| Lens | Start Surface | Focal Length | TTL to diagonal length of image plane |
|---|---|---|---|
| L1 | 2 | 3.578 | 0.69 |
| L2 | 4 | −10.678 | |
| L3 | 6 | −37.911 | |
| L4 | 8 | 2.391 | |
| L5 | 10 | −2.039 | |

Aspheric Surface Data

| | 2nd Surface | 3rd Surface | 4th Surface | 5th Surface | 6th Surface |
|---|---|---|---|---|---|
| k | 0.000000E+00 | 0.000000E+00 | 0.000000E+00 | 0.000000E+00 | 0.000000E+00 |
| A4 | −1.064443E−03 | −2.881999E−02 | −5.374325E−02 | −2.101498E−02 | −2.191402E−01 |
| A6 | 3.069523E−02 | −9.944241E−03 | 1.307596E−01 | 2.728816E−01 | 5.360305E−01 |
| A8 | −8.820166E−02 | −2.618342E−02 | −4.312363E−01 | −1.468810E+00 | −4.087218E+00 |
| A10 | 1.928452E−01 | 5.132113E−01 | 1.902399E+00 | 7.295509E+00 | 1.858621E+01 |
| A12 | −3.011363E−01 | −1.888284E+00 | −5.115959E+00 | −2.235491E+01 | −5.318618E+01 |
| A14 | 3.525080E−01 | 3.392254E+00 | 8.207039E+00 | 4.228473E+01 | 9.515741E+01 |
| A16 | −2.852231E−01 | −3.322072E+00 | −7.756101E+00 | −4.801300E+01 | −1.033929E+02 |
| A18 | 1.366393E−01 | 1.700027E+00 | 3.992419E+00 | 3.000263E+01 | 6.243276E+01 |
| A20 | −2.878494E−02 | −3.572319E−01 | −8.634548E−01 | −7.913938E+00 | −1.608506E+01 |

| | 7th Surface | 8th Surface | 9th Surface | 10th Surface | 11th Surface |
|---|---|---|---|---|---|
| k | 0.000000E+00 | 0.000000E+00 | −1.077822E+00 | −1.128519E+00 | −1.181160E+00 |
| A4 | −1.526894E−03 | −2.999776E−02 | 1.406252E−01 | 1.572819E−01 | −8.597580E−02 |
| A6 | 1.624264E−02 | 2.206420E−03 | −6.416972E−02 | −2.030069E−01 | 1.580380E−02 |
| A8 | 1.025878E−01 | 1.571634E−02 | −1.756112E−02 | 1.514138E−01 | 2.976038E−03 |
| A10 | −6.506448E−01 | −4.437342E−02 | 6.971385E−02 | −6.342733E−02 | −3.282807E−03 |
| A12 | 1.541000E+00 | 4.218194E−02 | −5.298225E−02 | 1.619925E−02 | 1.127895E−03 |
| A14 | −1.971291E+00 | −1.876841E−02 | 1.983558E−02 | −2.596572E−03 | −2.139250E−04 |
| A16 | 1.434396E+00 | 4.354518E−03 | −4.063755E−03 | 2.561567E−04 | 2.343590E−05 |
| A18 | −5.461204E−01 | −5.123734E−04 | 4.365200E−04 | −1.425694E−05 | −1.378257E−06 |
| A20 | 8.343099E−02 | 2.416503E−05 | −1.927093E−05 | 3.431665E−07 | 3.353773E−08 |

Figure 10:
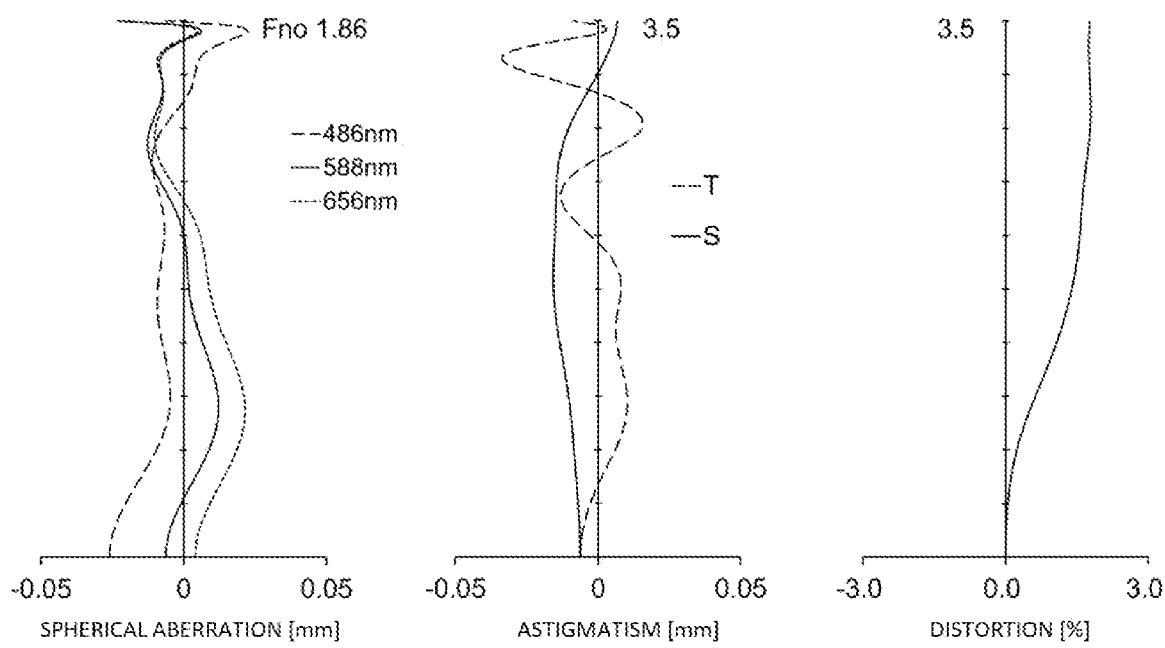
FIG. 10 is an aberration diagram showing spherical aberration, astigmatism, and distortion of the imaging lens of FIG. 9.
Figure 11:
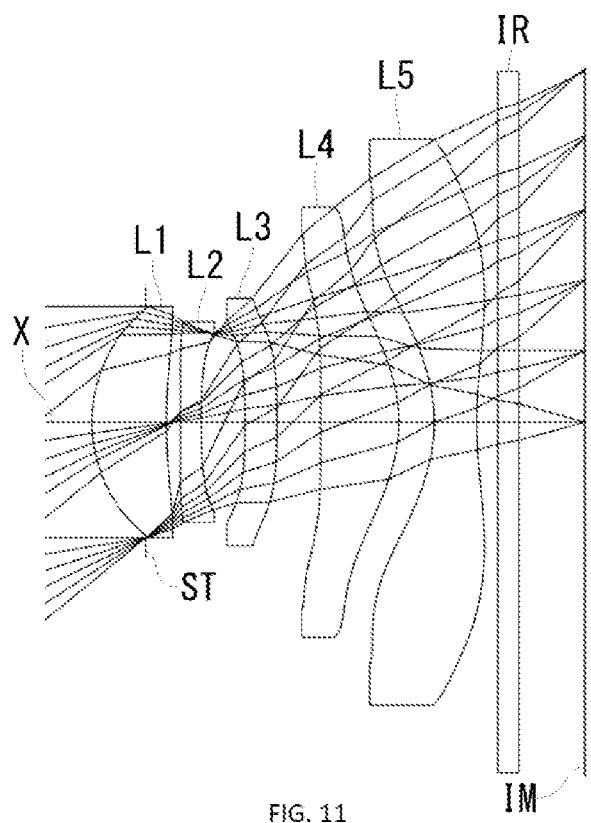
FIG. 11 is a sectional view of a schematic configuration of an imaging lens in Example 6 of the present invention.

As shown in FIG. 10, according to the imaging lens of the Example 5, aberrations can be also properly corrected.

Example 6

The basic lens data:

Example 6

Unit mm

| f = | 4.289 |
|---|---|
| Fno = | 1.86 |

-continued

| Example 6 | |
|---|---|
| ω (°) = | 39.2 |
| ih = | 3.5 |
| TTL = | 4.84 |

Surface Data

| i | r | d | nd | ν d | |
|---|---|---|---|---|---|
| (Object) | Infinity | Infinity | | | |
| (Stop) | Infinity | −0.536 | | | |
| 2* | 1.490 | 0.741 | 1.544 | 55.86 | (ν d1) |
| 3* | 5.675 | 0.139 | | | |
| 4* | −442.943 | 0.205 | 1.671 | 19.24 | (ν d2) |
| 5* | 6.448 | 0.437 | | | |
| 6* | −13.263 | 0.318 | 1.671 | 19.24 | (ν d3) |
| 7* | −19.068 | 0.436 | | | |
| 8* | 38.511 | 0.781 | 1.544 | 55.86 | (ν d4) |
| 9* | −1.430 | 0.352 | | | |
| 10* | −1.570 | 0.420 | 1.535 | 55.66 | (ν d5) |
| 11* | 3.931 | 0.210 | | | |
| 12 | Infinity | 0.210 | 1.517 | 64.20 | |
| 13 | Infinity | 0.659 | | | |
| Image Plane | | | | | |

Constituent Lens Data

| Lens | Start Surface | Focal Length | TTL to diagonal length of image plane |
|---|---|---|---|
| L1 | 2 | 3.495 | 0.69 |
| L2 | 4 | −9.474 | |
| L3 | 6 | −66.419 | |
| L4 | 8 | 2.550 | |
| L5 | 10 | −2.043 | |

Aspheric Surface Data

| | 2nd Surface | 3rd Surface | 4th Surface | 5th Surface | 6th Surface |
|---|---|---|---|---|---|
| k | 0.000000E+00 | 0.000000E+00 | 0.000000E+00 | 0.000000E+00 | 0.000000E+00 |
| A4 | −3.144711E−03 | −2.374844E−02 | −3.511569E−02 | 3.251904E−03 | −1.847085E−01 |
| A6 | 5.316822E−02 | −1.539163E−01 | 2.069872E−01 | 3.346030E−01 | 3.412779E−01 |
| A8 | −1.945229E−01 | 1.107781E+00 | −8.952245E−01 | −1.533409E+00 | −2.221189E+00 |
| A10 | 4.542255E−01 | −3.869423E+00 | 3.548365E+00 | 6.781574E+00 | 9.362123E+00 |
| A12 | −6.831373E−01 | 8.088792E+00 | −8.662869E+00 | −1.964611E+01 | −2.511036E+01 |
| A14 | 6.786460E−01 | −1.049003E+01 | 1.279473E+01 | 3.502110E+01 | 4.205186E+01 |
| A16 | −4.345877E−01 | 8.226102E+00 | −1.125979E+01 | −3.629816E+01 | −4.233706E+01 |
| A18 | 1.646468E−01 | −3.565419E+00 | 5.457373E+00 | 1.982537E+01 | 2.342572E+01 |
| A20 | −2.880834E−02 | 6.534924E−01 | −1.125590E+00 | −4.303143E+00 | −5.465560E+00 |

| | 7th Surface | 8th Surface | 9th Surface | 10th Surface | 11th Surface |
|---|---|---|---|---|---|
| k | 0.000000E+00 | −1.007553E+02 | −9.824602E−01 | −8.896803E−01 | −7.082599E−03 |
| A4 | −1.607350E−01 | −6.329124E−02 | 1.087956E−01 | 1.078733E−01 | −7.893722E−02 |
| A6 | 5.768966E−02 | 3.644488E−02 | −5.248082E−02 | −1.094603E−01 | 2.896620E−02 |
| A8 | 6.152051E−02 | −3.240288E−02 | 3.870439E−03 | 7.910115E−02 | −1.116226E−02 |
| A10 | −5.338865E−01 | 1.385026E−02 | 2.696120E−02 | −3.081594E−02 | 3.425049E−03 |
| A12 | 1.238638E+00 | −1.221381E−04 | −2.058273E−02 | 7.213687E−03 | −7.593562E−04 |
| A14 | −1.515166E+00 | −1.425132E−03 | 7.084506E−03 | −1.061699E−03 | 1.130558E−04 |
| A16 | 1.065857E+00 | 4.014698E−04 | −1.302469E−03 | 9.711951E−05 | −1.052724E−05 |

-continued

| | Example 6 | | | | |
|---|---|---|---|---|---|
| A18 | −3.965212E−01 | −4.456997E−05 | 1.241613E−04 | −5.059449E−06 | 5.549219E−07 |
| A20 | 5.917504E−02 | 1.575815E−06 | −4.859162E−06 | 1.121941E−07 | −1.286848E−08 |

Figure 12:
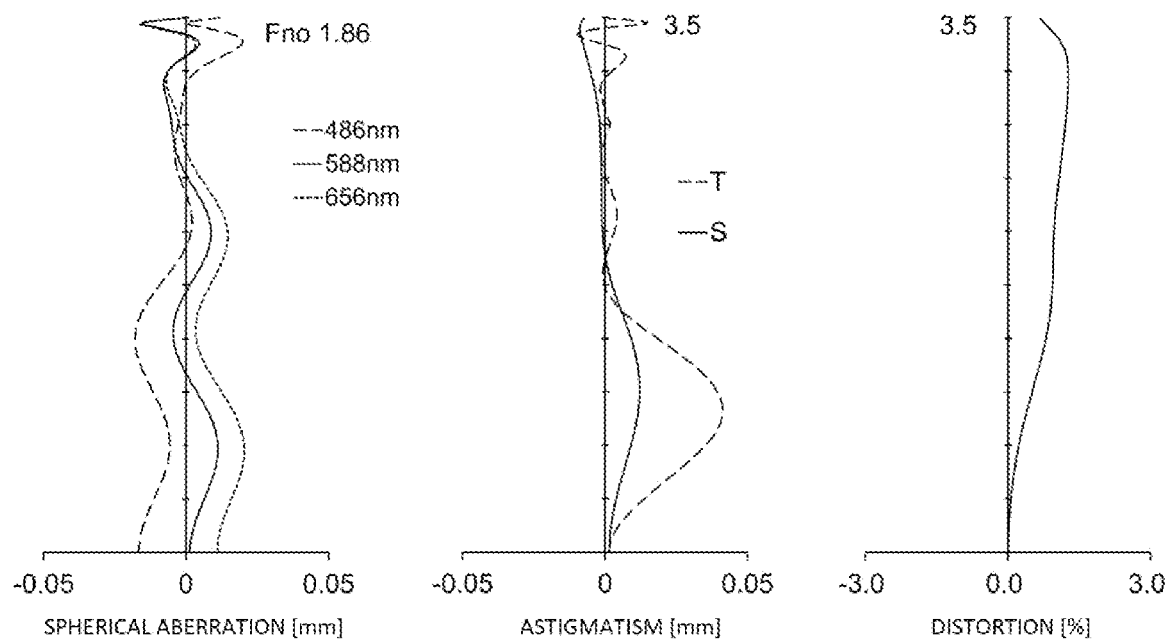
FIG. 12 is an aberration diagram showing spherical aberration, astigmatism, and distortion of the imaging lens of FIG. 11.
Figure 13:
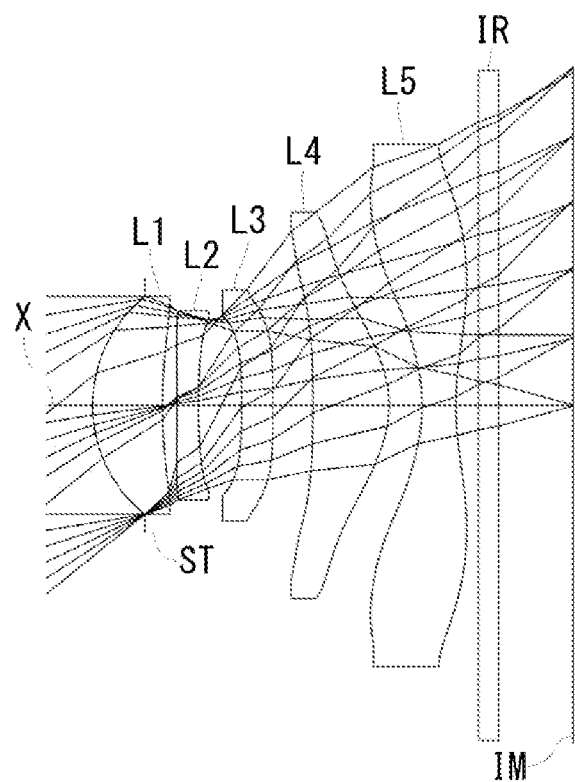
FIG. 13 is a sectional view of a schematic configuration of an imaging lens in Example 7 of the present invention.

As shown in FIG. 12, according to the imaging lens of the Example 6, aberrations can be also properly corrected.

Example 7

The basic lens data:

| Example 7 |
|---|
| Unit mm |

| | | |
|---|---|---|
| f = | | 4.329 |
| Fno = | | 1.90 |
| ω (°) = | | 39.0 |
| ih = | | 3.5 |
| TTL = | | 4.95 |

| Surface Data | | | | | |
|---|---|---|---|---|---|
| i | r | d | nd | ν d | |
| (Object | Infinity | Infinity | | | |
| (Stop) | Infinity | −0.544 | | | |
| 2* | 1.485 | 0.726 | 1.544 | 55.86 | (ν d1) |
| 3* | 4.868 | 0.154 | | | |
| 4* | 172.552 | 0.222 | 1.671 | 19.24 | (ν d2) |
| 5* | 6.676 | 0.450 | | | |
| 6* | −22.908 | 0.329 | 1.671 | 19.24 | (ν d3) |
| 7* | 1063.263 | 0.419 | | | |
| 8* | −14.281 | 0.795 | 1.544 | 55.86 | (ν d4) |
| 9* | −1.142 | 0.345 | | | |
| 10* | −1.750 | 0.350 | 1.535 | 55.66 | (ν d5) |
| 11* | 2.877 | 0.240 | | | |
| 12 | Infinity | 0.210 | 1.517 | 64.20 | |
| 13 | Infinity | 0.779 | | | |
| Image Plane | | | | | |

| Constituent Lens Data | | | |
|---|---|---|---|
| Lens | Start Surface | Focal Length | TTL to diagonal length of image plane |
| L1 | 2 | 3.650 | 0.71 |
| L2 | 4 | −10.359 | |
| L3 | 6 | −33.428 | |
| L4 | 8 | 2.233 | |
| L5 | 10 | −1.982 | |

| Aspheric Surface Data | | | | | |
|---|---|---|---|---|---|
| | 2nd Surface | 3rd Surface | 4th Surface | 5th Surface | 6th Surface |
| k | 0.000000E+00 | 0.000000E+00 | 0.000000E+00 | 0.000000E+00 | 0.000000E+00 |
| A4 | −1.676852E−04 | −2.910502E−02 | −5.516372E−02 | −1.977773E−02 | −2.208375E−01 |
| A6 | 3.068720E−02 | −1.101780E−02 | 1.332738E−01 | 2.756268E−01 | 5.305175E−01 |
| A8 | −8.825243E−02 | −2.584945E−02 | −4.314932E−01 | −1.472814E+00 | −4.095363E+00 |
| A10 | 1.925978E−01 | 5.139970E−01 | 1.899124E+00 | 7.293506E+00 | 1.858701E+01 |
| A12 | −3.010412E−01 | −1.891321E+00 | −5.115978E+00 | −2.235065E+01 | −5.318715E+01 |
| A14 | 3.526571E−01 | 3.396111E+00 | 8.210648E+00 | 4.229433E+01 | 9.516390E+01 |
| A16 | −2.852772E−01 | −3.321855E+00 | −7.748968E+00 | −4.794136E+01 | −1.033906E+02 |
| A18 | 1.366817E−01 | 1.697596E+00 | 3.993617E+00 | 2.989224E+01 | 6.243062E+01 |
| A20 | −2.880104E−02 | −3.575552E−01 | −8.744128E−01 | −7.882620E+00 | −1.608428E+01 |

| | 7th Surface | 8th Surface | 9th Surface | 10th Surface | 11th Surface |
|---|---|---|---|---|---|
| k | 0.000000E+00 | 0.000000E+00 | −1.058786E+00 | −1.134563E+00 | −1.240586E+00 |
| A4 | −1.502441E−01 | −2.764552E−02 | 1.429195E−01 | 1.584855E−01 | −8.772950E−02 |
| A6 | 1.584803E−02 | 3.577908E−03 | −6.518586E−02 | −2.030779E−01 | 1.618298E−02 |
| A8 | 9.245632E−02 | 1.517615E−02 | −1.669310E−02 | 1.513938E−01 | 2.938565E−03 |
| A10 | −6.490093E−01 | −4.430367E−02 | 6.960455E−02 | −6.342834E−02 | −3.282077E−03 |
| A12 | 1.542789E+00 | 4.216836E−02 | −5.298978E−02 | 1.619981E−02 | 1.128079E−03 |

-continued

| Example 7 | | | | | |
|---|---|---|---|---|---|
| A14 | −1.969520E+00 | −1.877256E−02 | 1.983450E−02 | −2.596546E−03 | −2.138964E−04 |
| A16 | 1.432602E+00 | 4.346055E−03 | −4.063302E−03 | 2.561599E−04 | 2.343667E−05 |
| A18 | −5.463807E−01 | −5.089894E−04 | 4.365146E−04 | −1.425390E−05 | −1.377893E−06 |
| A20 | 8.352279E−02 | 2.380480E−05 | −1.931004E−05 | 3.425731E−07 | 3.346890E−08 |

Figure 14:
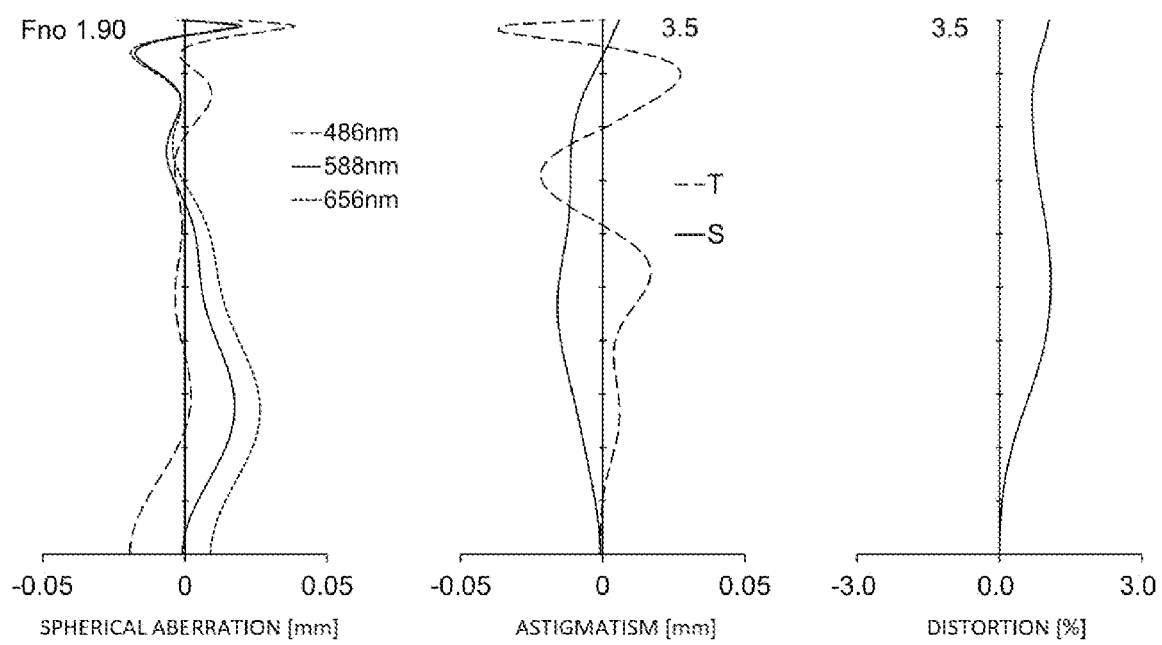
FIG. 14 is an aberration diagram showing spherical aberration, astigmatism, and distortion of the imaging lens of FIG. 13.
Figure 15:
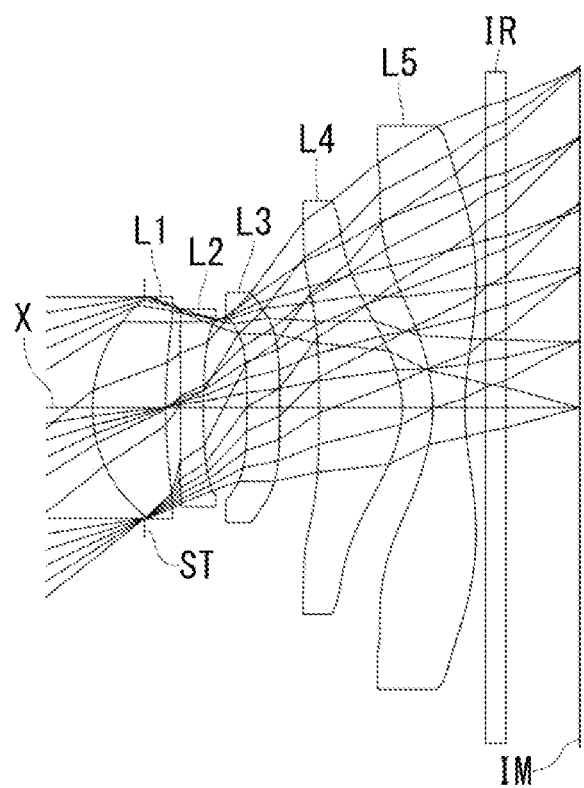
FIG. 15 is a sectional view of a schematic configuration of an imaging lens in Example 8 of the present invention.

As shown in FIG. 14, according to the imaging lens of the Example 7, aberrations can be also properly corrected.

Example 8

The basic lens data:

| Example 8 |
|---|
| Unit mm |

| | |
|---|---|
| f = | 4.381 |
| Fno = | 1.90 |
| ω (°) = | 38.6 |
| ih = | 3.5 |
| TTL = | 5.00 |

| Surface Data | | | | |
|---|---|---|---|---|
| i | r | d | nd | ν d |
| (Object) | Infinity | Infinity | | |
| (Stop) | Infinity | −0.542 | | |
| 2* | 1.484 | 0.760 | 1.544 | 55.86 (ν d1) |
| 3* | 4.928 | 0.157 | | |
| 4* | 206.109 | 0.236 | 1.661 | 20.37 (ν d2) |
| 5* | 6.337 | 0.455 | | |
| 6* | −22.715 | 0.339 | 1.661 | 20.37 (ν d3) |
| 7* | 2270.656 | 0.413 | | |
| 8* | −17.138 | 0.865 | 1.544 | 55.86 (ν d4) |
| 9* | −1.108 | 0.318 | | |
| 10* | −1.603 | 0.333 | 1.535 | 55.66 (ν d5) |
| 11* | 2.901 | 0.215 | | |
| 12 | Infinity | 0.210 | 1.517 | 64.20 |
| 13 | Infinity | 0.768 | | |
| Image Plane | | | | |

| Constituent Lens Data | | | |
|---|---|---|---|
| Lens | Start Surface | Focal Length | TTL to diagonal length of image plane |
| L1 | 2 | 3.619 | 0.71 |
| L2 | 4 | −9.900 | |
| L3 | 6 | −34.035 | |
| L4 | 8 | 2.136 | |
| L5 | 10 | −1.882 | |

| Aspheric Surface Data | | | | | |
|---|---|---|---|---|---|
| | 2nd Surface | 3rd Surface | 4th Surface | 5th Surface | 6th Surface |
| k | 0.000000E+00 | 0.000000E+00 | 0.000000E+00 | 0.000000E+00 | 0.000000E+00 |
| A4 | 6.750411E−04 | −2.867186E−02 | −6.092328E−02 | −2.541285E−02 | −2.265271E−01 |
| A6 | 2.953962E−02 | −1.422551E−02 | 1.281275E−01 | 2.761287E−01 | 5.187019E−01 |
| A8 | −8.822263E−02 | −2.813506E−02 | −4.293327E−01 | −1.467015E+00 | −4.095185E+00 |
| A10 | 1.927921E−01 | 5.141558E−01 | 1.903612E+00 | 7.291873E+00 | 1.858079E+01 |
| A12 | −3.008658E−01 | −1.883051E+00 | −5.109453E+00 | −2.236518E+01 | −5.317456E+01 |
| A14 | 3.527503E−01 | 3.395880E+00 | 8.205569E+00 | 4.231795E+01 | 9.515963E+01 |
| A16 | −2.854078E−01 | −3.330005E+00 | −7.760735E+00 | −4.790273E+01 | −1.034086E+02 |
| A18 | 1.365702E−01 | 1.695087E+00 | 3.991513E+00 | 2.981126E+01 | 6.241756E+01 |
| A20 | −2.871735E−02 | −3.523899E−01 | −8.635766E−01 | −7.833606E+00 | −1.605049E+01 |
| | 7th Surface | 8th Surface | 9th Surface | 10th Surface | 11th Surface |
| k | 0.000000E+00 | 9.318250E−03 | −1.077823E+00 | −1.128515E+00 | −1.181396E+00 |
| A4 | −1.528443E−01 | −2.712679E−02 | 1.469387E−01 | 1.658296E−01 | −8.700484E−02 |
| A6 | 7.182110E−03 | 4.461355E−03 | −6.511998E−02 | −2.035536E−01 | 1.607766E−02 |
| A8 | 9.527758E−02 | 1.512454E−02 | −1.660052E−02 | 1.513616E−01 | 2.946625E−03 |

-continued

| Example 8 | | | | | |
|---|---|---|---|---|---|
| A10 | −6.494270E−01 | −4.438289E−02 | 6.960701E−02 | −6.343082E−02 | −3.281219E−03 |
| A12 | 1.541858E+00 | 4.218066E−02 | −5.299977E−02 | 1.620056E−02 | 1.128127E−03 |
| A14 | −1.970405E+00 | −1.877254E−02 | 1.983638E−02 | −2.596619E−03 | −2.138267E−04 |
| A16 | 1.432308E+00 | 4.350198E−03 | −4.064107E−03 | 2.561540E−04 | 2.342167E−05 |
| A18 | −5.457717E−01 | −5.093582E−04 | 4.366415E−04 | −1.425447E−05 | −1.377732E−06 |
| A20 | 8.366987E−02 | 2.373296E−05 | −1.927535E−05 | 3.424686E−07 | 3.344187E−08 |

Figure 16:
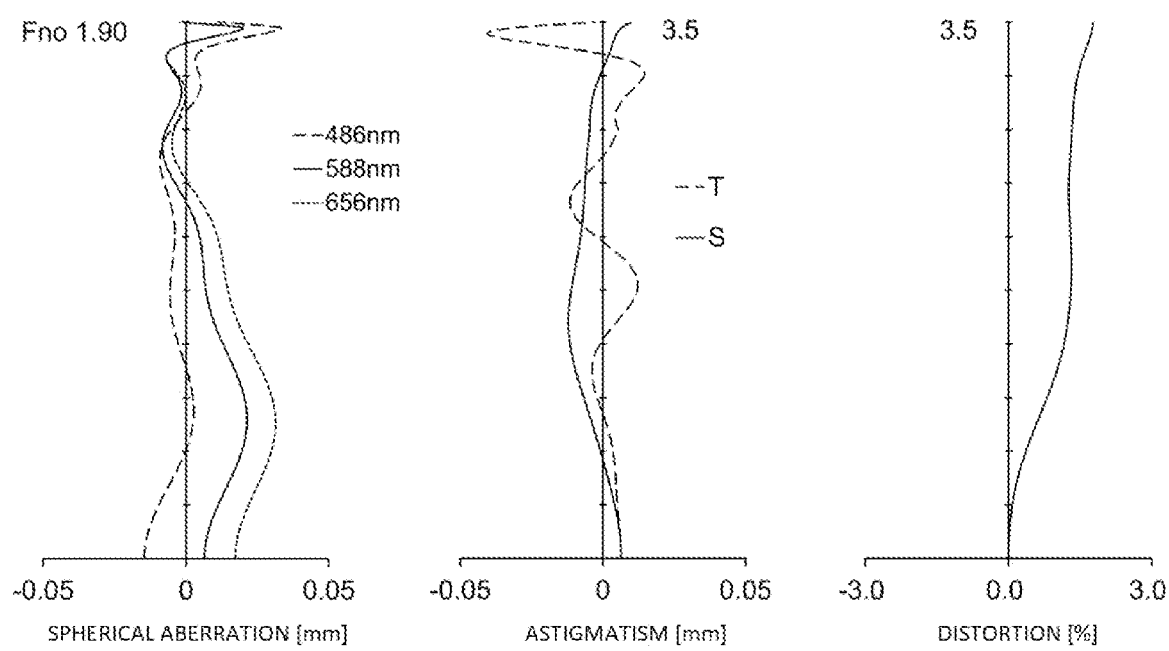
FIG. 16 is an aberration diagram showing spherical aberration, astigmatism, and distortion of the imaging lens of FIG. 15.
Figure 17:
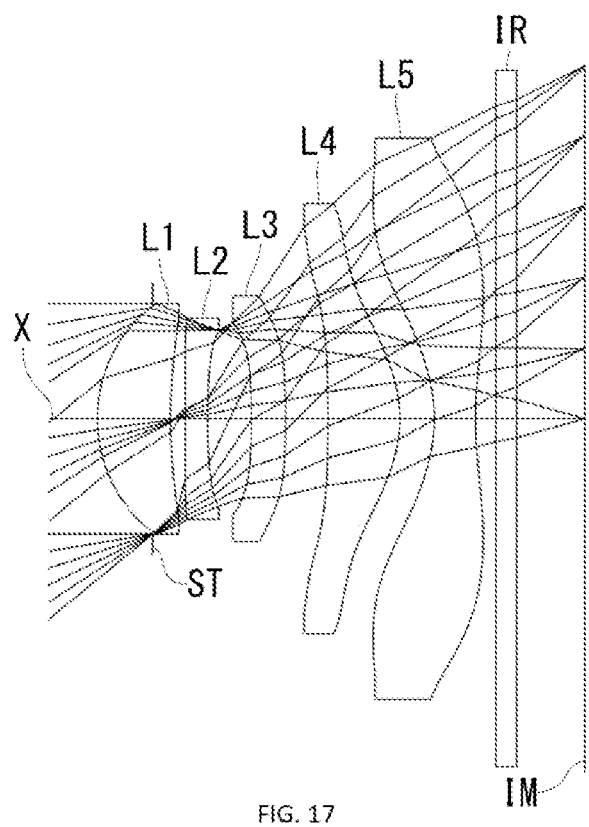
FIG. 17 is a sectional view of a schematic configuration of an imaging lens in Example 9 of the present invention.

As shown in FIG. 16, according to the imaging lens of the Example 8, aberrations can be also properly corrected.

Example 9

The basic lens data:

| Example 9 |
|---|
| Unit mm |

| | |
|---|---|
| f = | 4.267 |
| Fno = | 1.84 |
| ω (°) = | 39.4 |
| ih = | 3.5 |
| TTL = | 4.82 |

| Surface Data | | | | | |
|---|---|---|---|---|---|
| i | r | d | nd | ν d | |
| (Object | Infinity | Infinity | | | |
| (Stop) | Infinity | −0.556 | | | |
| 2* | 1.473 | 0.734 | 1.544 | 55.86 | (ν d1) |
| 3* | 5.093 | 0.147 | | | |
| 4* | 229.504 | 0.226 | 1.671 | 19.24 | (ν d2) |
| 5* | 7.135 | 0.439 | | | |
| 6* | −10.832 | 0.342 | 1.671 | 19.24 | (ν d3) |
| 7* | −15.247 | 0.428 | | | |
| 8* | −22.881 | 0.724 | 1.544 | 55.86 | (ν d4) |
| 9* | −1.284 | 0.344 | | | |
| 10* | −1.556 | 0.414 | 1.535 | 55.66 | (ν d5) |
| 11* | 3.847 | 0.202 | | | |
| 12 | Infinity | 0.210 | 1.517 | 64.20 | |
| 13 | Infinity | 0.683 | | | |
| Image Plane | | | | | |

| Constituent Lens Data | | | |
|---|---|---|---|
| Lens | Start Surface | Focal Length | TTL to diagonal length of image plane |
| L1 | 2 | 3.552 | 0.69 |
| L2 | 4 | −10.984 | |
| L3 | 6 | −57.563 | |
| L4 | 8 | 2.471 | |
| L5 | 10 | −2.018 | |

| Aspheric Surface Data | | | | | |
|---|---|---|---|---|---|
| | 2nd Surface | 3rd Surface | 4th Surface | 5th Surface | 6th Surface |
| k | 0.000000E+00 | 0.000000E+00 | 0.000000E+00 | 0.000000E+00 | 0.000000E+00 |
| A4 | −4.283011E−03 | −1.116491E−02 | −4.269667E−02 | 1.686083E−03 | −1.653730E−01 |
| A6 | 5.785255E−02 | −1.804075E−01 | 1.927712E−01 | 2.605764E−01 | 3.089567E−01 |
| A8 | −1.972168E−01 | 1.128016E+00 | −8.905757E−01 | −1.439822E+00 | −2.223489E+00 |
| A10 | 4.545880E−01 | −3.867800E+00 | 3.551598E+00 | 6.853029E+00 | 9.469574E+00 |
| A12 | −6.802247E−01 | 8.087259E+00 | −8.647195E+00 | −1.969637E+01 | −2.526344E+01 |
| A14 | 6.781948E−01 | −1.047756E+01 | 1.280085E+01 | 3.470381E+01 | 4.200405E+01 |
| A16 | −4.352779E−01 | 8.217182E+00 | −1.129020E+01 | −3.654346E+01 | −4.237840E+01 |
| A18 | 1.645112E−01 | −3.576902E+00 | 5.449198E+00 | 2.109442E+01 | 2.381481E+01 |
| A20 | −2.805971E−02 | 6.623699E−01 | −1.106851E+00 | −5.097184E+00 | −5.733521E+00 |
| | 7th Surface | 8th Surface | 9th Surface | 10th Surface | 11th Surface |
| k | 0.000000E+00 | 0.000000E+00 | −1.043718E+00 | −1.000831E+00 | −9.997749E−01 |
| A4 | −1.287570E−01 | −4.628302E−02 | 1.123358E−01 | 1.135113E−01 | −8.355635E−02 |

-continued

| | Example 9 | | | | |
|---|---|---|---|---|---|
| A6 | 4.140787E−02 | 3.452761E−02 | −4.778363E−02 | −1.136378E−01 | 3.247321E−02 |
| A8 | 4.314469E−02 | −3.319581E−02 | 3.249033E−03 | 7.967505E−02 | −1.196120E−02 |
| A10 | −5.039489E−01 | 1.383266E−02 | 2.669642E−02 | −3.080819E−02 | 3.481901E−03 |
| A12 | 1.231205E+00 | −1.044392E−04 | −2.058057E−02 | 7.211263E−03 | −7.567729E−04 |
| A14 | −1.530102E+00 | −1.423486E−03 | 7.089159E−03 | −1.062679E−03 | 1.128819E−04 |
| A16 | 1.067818E+00 | 4.006565E−04 | −1.301679E−03 | 9.708837E−05 | −1.056417E−05 |
| A18 | −3.910838E−01 | −4.461354E−05 | 1.241911E−04 | −5.048800E−06 | 5.539564E−07 |
| A20 | 5.791619E−02 | 1.795780E−06 | −4.863827E−06 | 1.145903E−07 | −1.241937E−08 |

Figure 18:
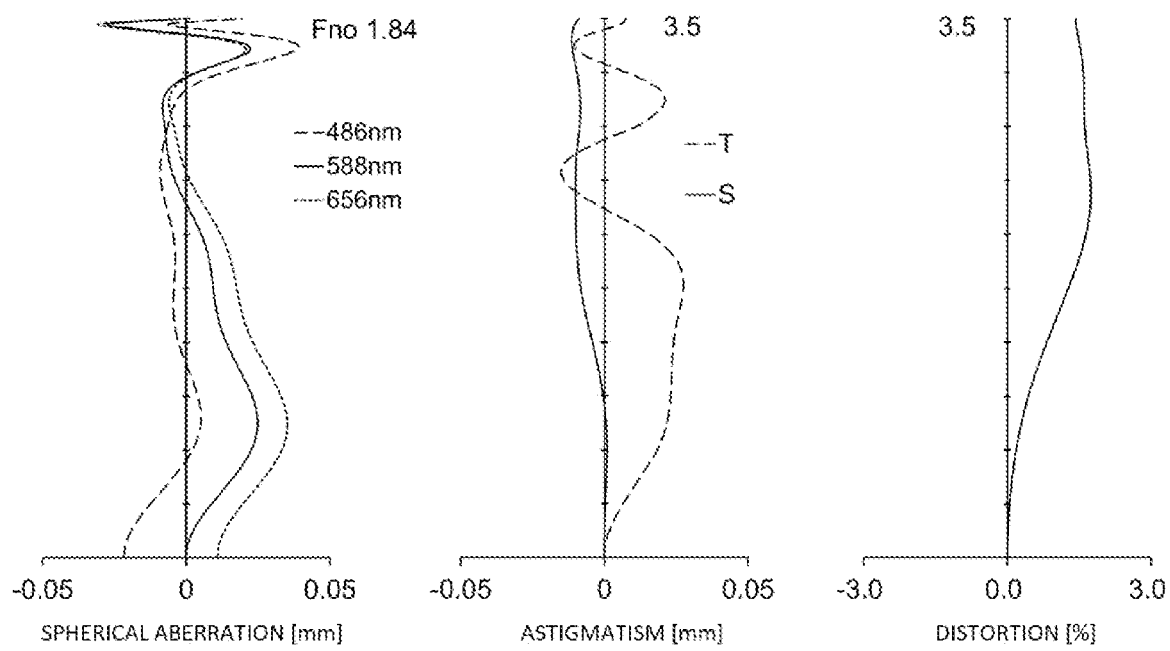
FIG. 18 is an aberration diagram showing spherical aberration, astigmatism, and distortion of the imaging lens of FIG. 17.
Figure 19:
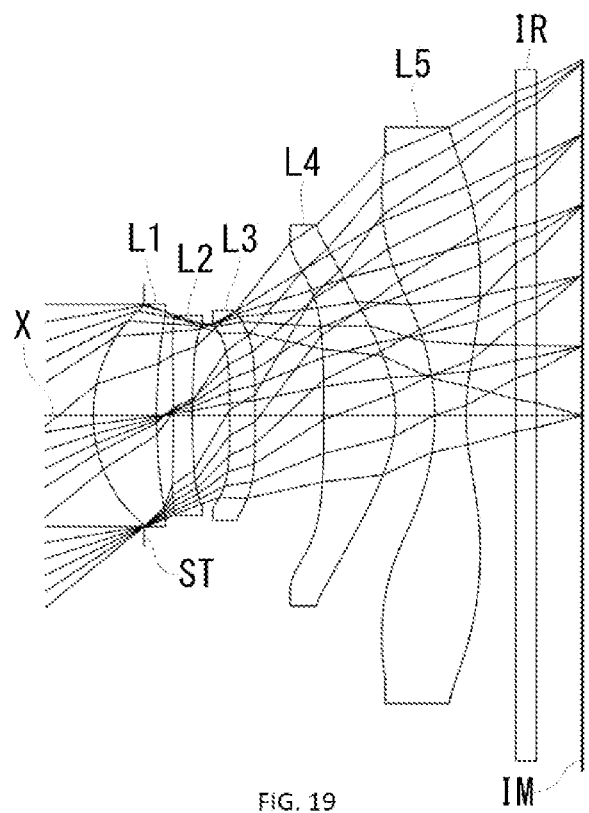
FIG. 19 is a sectional view of a schematic configuration of an imaging lens in Example 10 of the present invention.

As shown in FIG. 18, according to the imaging lens of the Example 9, aberrations can be also properly corrected.

Example 10

The basic lens data:

| Example 10 |
|---|
| Unit mm |

| f = | 4.259 |
|---|---|
| Fno = | 1.89 |
| ω (°) = | 39.4 |
| ih = | 3.5 |
| TTL = | 4.88 |

| Surface Data | | | | | |
|---|---|---|---|---|---|
| i | r | d | nd | ν d | |
| (Object | Infinity | Infinity | | | |
| (Stop) | Infinity | −0.512 | | | |
| 2* | 1.524 | 0.637 | 1.544 | 55.86 | (ν d1) |
| 3* | 5.346 | 0.172 | | | |
| 4* | −19.241 | 0.192 | 1.680 | 18.42 | (ν d2) |
| 5* | 9.441 | 0.374 | | | |
| 6* | 66.664 | 0.258 | 1.671 | 19.24 | (ν d3) |
| 7* | 91.629 | 0.697 | | | |
| 8* | −21.162 | 0.723 | 1.544 | 55.86 | (ν d4) |
| 9* | −1.275 | 0.399 | | | |
| 10* | −2.143 | 0.314 | 1.535 | 55.66 | (ν d5) |
| 11* | 2.335 | 0.502 | | | |
| 12 | Infinity | 0.210 | 1.517 | 64.20 | |
| 13 | Infinity | 0.468 | | | |
| Image Plane | | | | | |

| Constituent Lens Data | | | |
|---|---|---|---|
| Lens | Start Surface | Focal Length | TTL to diagonal length of image plane |
| L1 | 2 | 3.698 | 0.70 |
| L2 | 4 | −9.292 | |
| L3 | 6 | 363.285 | |
| L4 | 8 | 2.462 | |
| L5 | 10 | −2.040 | |

| Aspheric Surface Data | | | | | |
|---|---|---|---|---|---|
| | 2nd Surface | 3rd Surface | 4th Surface | 5th Surface | 6th Surface |
| k | 5.030424E−02 | 4.994744E+00 | 0.000000E+00 | −2.240441E+01 | 0.000000E+00 |
| A4 | −3.377190E−03 | −2.090222E−02 | −4.795879E−02 | −7.293581E−03 | −2.095610E−01 |
| A6 | 6.025066E−02 | −4.625369E−02 | 2.944515E−01 | 1.255575E−01 | 2.425152E−01 |
| A8 | −2.510604E−01 | 2.354722E−01 | −1.148182E+00 | −3.582167E−02 | −1.930963E+00 |
| A10 | 6.942157E−01 | −3.930120E−01 | 4.098402E+00 | 2.795126E−01 | 8.070883E+00 |
| A12 | −1.211465E+00 | 1.178246E−02 | −9.539020E+00 | −1.668550E+00 | −2.102176E+01 |
| A14 | 1.354844E+00 | 9.896854E−01 | 1.382304E+01 | 3.964529E+00 | 3.386998E+01 |
| A16 | −9.382123E−01 | −1.545309E+00 | −1.208955E+01 | −4.763353E+00 | −3.295229E+01 |

-continued

| Example 10 | | | | | |
|---|---|---|---|---|---|
| A18 | 3.682106E−01 | 9.963335E−01 | 5.849943E+00 | 2.872512E+00 | 1.767389E+01 |
| A20 | −6.313220E−02 | −2.421901E−01 | −1.200593E+00 | −6.620371E−01 | −3.975078E+00 |

| | 7th Surface | 8th Surface | 9th Surface | 10th Surface | 11th Surface |
|---|---|---|---|---|---|
| k | 0.000000E+00 | 0.000000E+00 | −9.032530E−01 | −9.213075E−01 | −1.573028E+00 |
| A4 | −1.740357E−01 | −2.847713E−02 | 1.486403E−01 | 1.090916E−01 | −1.192055E−01 |
| A6 | 2.281426E−01 | 3.876003E−02 | −9.561814E−02 | −1.699767E−01 | 4.103462E−02 |
| A8 | −1.351890E+00 | −5.958106E−02 | 6.352750E−02 | 1.298480E−01 | −9.785382E−03 |
| A10 | 4.421027E+00 | 1.664235E−02 | −5.148156E−02 | −5.236875E−02 | 1.628132E−03 |
| A12 | −8.942482E+00 | 2.494097E−02 | 3.912358E−02 | 1.265697E−02 | −1.979298E−04 |
| A14 | 1.128687E+01 | −2.788186E−02 | −1.877412E−02 | −1.912359E−03 | 2.020267E−05 |
| A16 | −8.636410E+00 | 1.226804E−02 | 5.074281E−03 | 1.779142E−04 | −1.920897E−06 |
| A18 | 3.662281E+00 | −2.536500E−03 | −7.125638E−04 | −9.353287E−06 | 1.355073E−07 |
| A20 | −6.542198E−01 | 2.024586E−04 | 4.068117E−05 | 2.129896E−07 | −4.373455E−09 |

Figure 20:
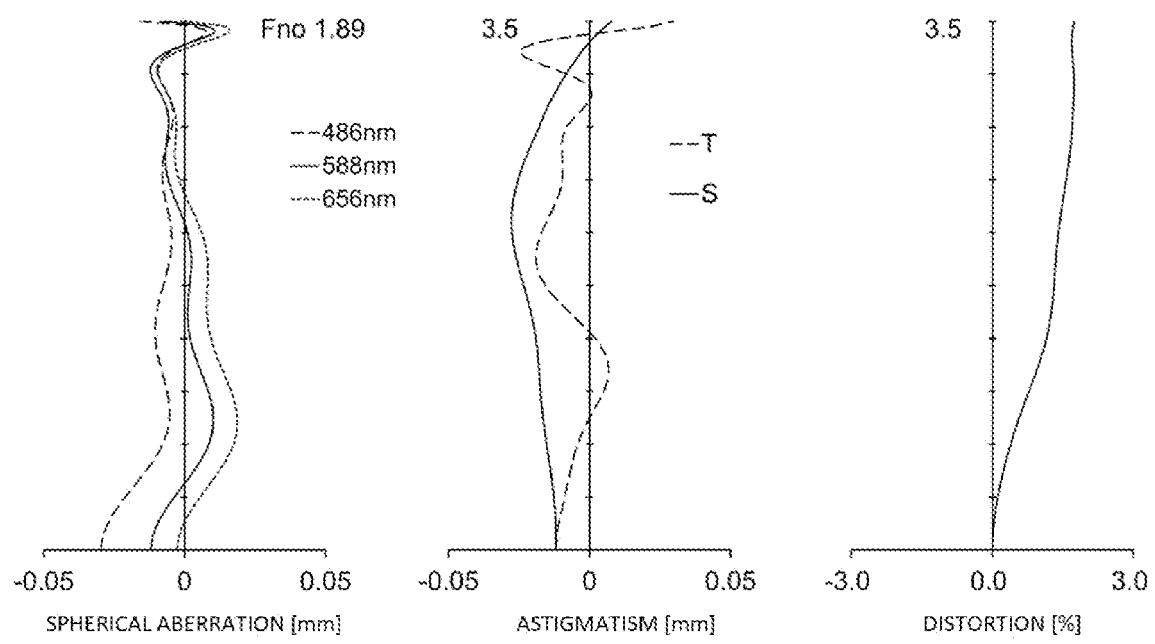
FIG. 20 is an aberration diagram showing spherical aberration, astigmatism, and distortion of the imaging lens of FIG. 19.
Figure 21:
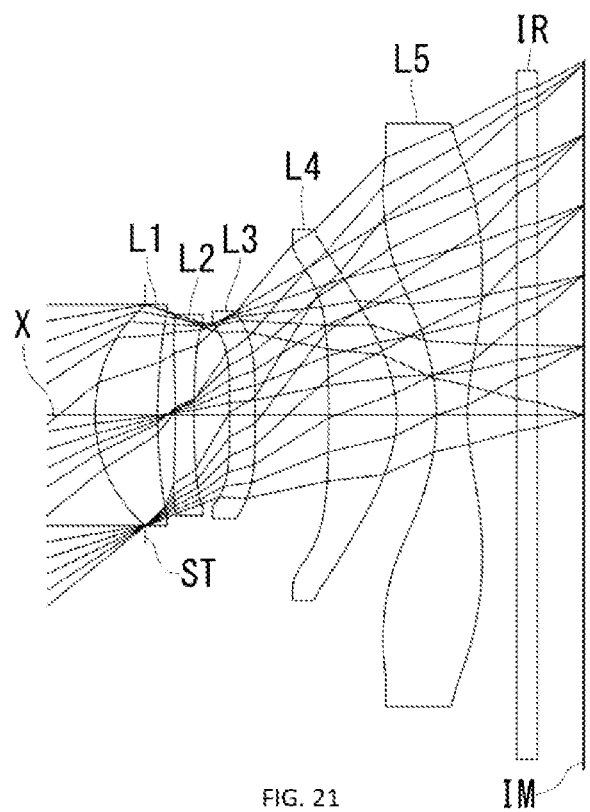
FIG. 21 is a sectional view of a schematic configuration of an imaging lens in Example 11 of the present invention.

As shown in FIG. 20, according to the imaging lens of the Example 10, aberrations can be also properly corrected.

Example 11

The basic lens data:

| Example 11 |
|---|
| Unit mm |

| | |
|---|---|
| f = | 4.259 |
| Fno = | 1.89 |
| ω (°) = | 39.4 |
| ih = | 3.5 |
| TTL = | 4.89 |

| Surface Data | | | | | |
|---|---|---|---|---|---|
| i | r | d | nd | ν d | |
| (Object | Infinity | Infinity | | | |
| (Stop) | Infinity | −0.510 | | | |
| 2* | 1.536 | 0.633 | 1.544 | 55.86 | (ν d1) |
| 3* | 5.366 | 0.180 | | | |
| 4* | −13.458 | 0.192 | 1.680 | 18.42 | (ν d2) |
| 5* | 11.964 | 0.360 | | | |
| 6* | 573.909 | 0.258 | 1.671 | 19.24 | (ν d3) |
| 7* | −150.025 | 0.747 | | | |
| 8* | −23.508 | 0.691 | 1.544 | 55.86 | (ν d4) |
| 9* | −1.281 | 0.402 | | | |
| 10* | −2.195 | 0.314 | 1.535 | 55.66 | (ν d5) |
| 11* | 2.285 | 0.502 | | | |
| 12 | Infinity | 0.210 | 1.517 | 64.20 | |
| 13 | Infinity | 0.474 | | | |
| Image Plane | | | | | |

| Constituent Lens Data | | | |
|---|---|---|---|
| Lens | Start Surface | Focal Length | TTL to diagonal length of image plane |
| L1 | 2 | 3.736 | 0.70 |
| L2 | 4 | −9.289 | |
| L3 | 6 | 177.343 | |
| L4 | 8 | 2.462 | |
| L5 | 10 | −2.043 | |

| Aspheric Surface Data | | | | | |
|---|---|---|---|---|---|
| | 2nd Surface | 3rd Surface | 4th Surface | 5th Surface | 6th Surface |
| k | 6.547562E−02 | 5.877725E+00 | 0.000000E+00 | 0.000000E+00 | 0.000000E+00 |
| A4 | −5.635093E−03 | −2.520544E−02 | −4.167735E−02 | −4.925016E−03 | −1.977129E−01 |
| A6 | 8.028019E−02 | 3.300507E−02 | 2.732348E−01 | 6.824301E−02 | 4.502965E−02 |
| A8 | −3.385687E−01 | −2.538188E−01 | −1.016197E+00 | 3.108192E−01 | −4.709380E−01 |
| A10 | 9.228113E−01 | 1.290312E+00 | 3.546246E+00 | −1.176666E+00 | 1.886971E+00 |
| A12 | −1.581004E+00 | −3.478131E+00 | −8.209004E+00 | 2.244153E+00 | −4.945442E+00 |

-continued

Example 11

| | | | | | |
|---|---|---|---|---|---|
| A14 | 1.728105E+00 | 5.433524E+00 | 1.190789E+01 | −2.765830E+00 | 7.827221E+00 |
| A16 | −1.165961E+00 | −4.934680E+00 | −1.045034E+01 | 2.376429E+00 | −7.332868E+00 |
| A18 | 4.446863E−01 | 2.412879E+00 | 5.070797E+00 | −1.387370E+00 | 3.648217E+00 |
| A20 | −7.376753E−02 | −4.906802E−01 | −1.040139E+00 | 4.239917E−01 | −6.955356E−01 |

| | 7th Surface | 8th Surface | 9th Surface | 10th Surface | 11th Surface |
|---|---|---|---|---|---|
| k | 0.000000E+00 | 0.000000E+00 | −8.721110E−01 | −8.829214E−01 | −1.274733E+00 |
| A4 | −1.722186E−01 | −3.080526E−02 | 1.515456E−01 | 9.993731E−02 | −1.267027E−01 |
| A6 | 1.870103E−01 | 2.663559E−02 | −1.299136E−01 | −1.639146E−01 | 4.533409E−02 |
| A8 | −1.020317E+00 | −2.896348E−02 | 1.409342E−01 | 1.302348E−01 | −1.113100E−02 |
| A10 | 3.155719E+00 | −2.739165E−02 | −1.551882E−01 | −5.421786E−02 | 1.737975E−03 |
| A12 | −6.126798E+00 | 6.424175E−02 | 1.233815E−01 | 1.348408E−02 | −1.422399E−04 |
| A14 | 7.484878E+00 | −4.777263E−02 | −5.981105E−02 | −2.091852E−03 | −5.545861E−08 |
| A16 | −5.563920E+00 | 1.753551E−02 | 1.674808E−02 | 1.995007E−04 | 1.064701E−06 |
| A18 | 2.291510E+00 | −3.172197E−03 | −2.502366E−03 | −1.074255E−05 | −7.757103E−08 |
| A20 | −3.935708E−01 | 2.251296E−04 | 1.551810E−04 | 2.505862E−07 | 1.644955E−09 |

Figure 22:
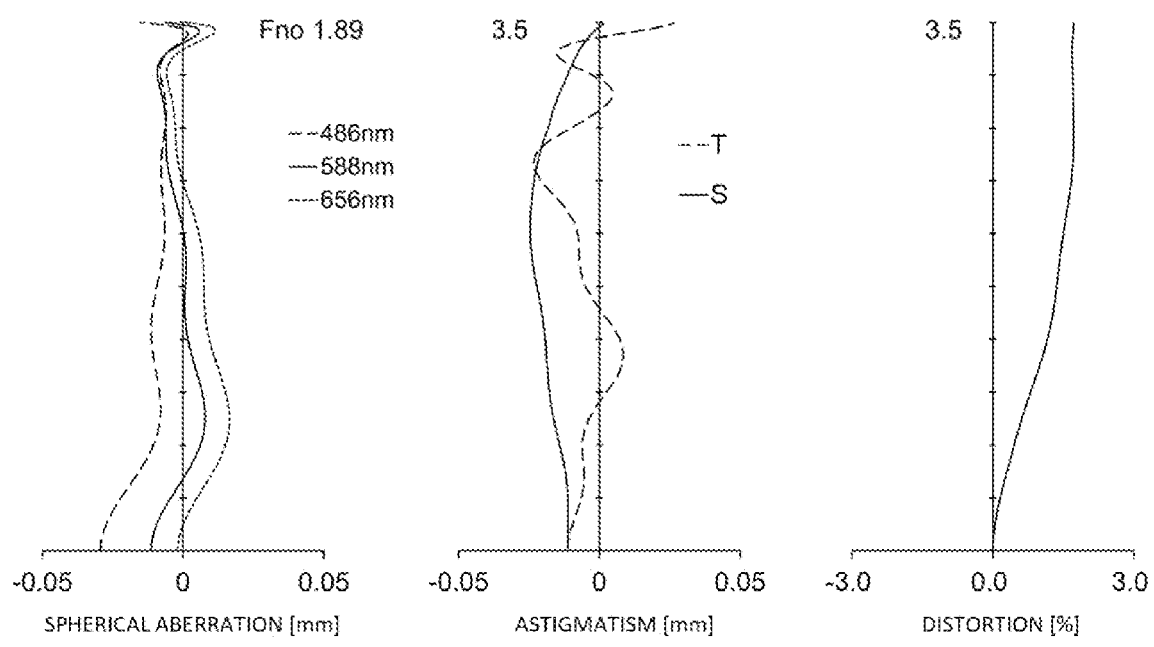
FIG. 22 is an aberration diagram showing spherical aberration, astigmatism, and distortion of the imaging lens of FIG. 21.

As shown in FIG. 22, according to the imaging lens of the Example 11, aberrations can be also properly corrected.

As described above, the imaging lens according to the present embodiments has small F-number and a small ratio of a total track length to a diagonal length of image plane, and allows satisfactory correction of aberrations. The followings are values corresponding to the conditional expressions (1) to (14) of the Examples according to the present embodiments.

TABLE

| Conditonal Expression | | Example 1 | Example 2 | Example 3 | Example 4 | Example 5 | Example 6 |
|---|---|---|---|---|---|---|---|
| (1) | f/Dep | 1.85 | 1.86 | 1.84 | 1.86 | 1.86 | 1.86 |
| (2) | T3/T2 | 1.427 | 1.429 | 1.338 | 1.538 | 1.419 | 1.551 |
| (3) | vd3 | 20.4 | 20.4 | 20.4 | 19.2 | 19.2 | 19.2 |
| (4) | R5f/R5r | −0.705 | −0.773 | −0.754 | −0.457 | −0.633 | −0.399 |
| (5) | \|f3\|/f | 18.842 | 18.577 | 15.393 | 16.323 | 8.901 | 15.486 |
| (6) | f23/f | −2.341 | −2.367 | −2.424 | −2.105 | −1.939 | −1.933 |
| (7) | f34/f | 0.654 | 0.648 | 0.639 | 0.584 | 0.580 | 0.604 |
| (8) | \|R2r/R3f\| | 0.348 | 0.348 | 0.325 | 0.491 | 0.260 | 0.486 |
| (9) | D12/f | 0.035 | 0.035 | 0.034 | 0.035 | 0.034 | 0.032 |
| (10) | D12/D23 | 0.409 | 0.408 | 0.412 | 0.336 | 0.330 | 0.318 |
| (11) | D34/D23 | 1.646 | 1.655 | 1.723 | 0.986 | 0.934 | 0.998 |
| (12) | D34/T4 | 1.106 | 1.116 | 1.130 | 0.585 | 0.527 | 0.558 |
| (13) | vd4 | 55.9 | 55.9 | 55.9 | 55.9 | 55.9 | 55.9 |
| (14) | Dep/Hmax | 0.666 | 0.660 | 0.669 | 0.658 | 0.658 | 0.663 |

| Conditonal Expression | | Example 7 | Example 8 | Example 9 | Example 10 | Example 11 |
|---|---|---|---|---|---|---|
| (1) | f/Dep | 1.90 | 1.90 | 1.84 | 1.89 | 1.89 |
| (2) | T3/T2 | 1.482 | 1.436 | 1.513 | 1.344 | 1.344 |
| (3) | vd3 | 19.2 | 20.4 | 19.2 | 19.2 | 19.2 |
| (4) | R5f/R5r | −0.608 | −0.553 | −0.404 | −0.918 | −0.961 |
| (5) | \|f3\|/f | 7.722 | 7.769 | 13.490 | 85.298 | 41.640 |
| (6) | f23/f | −1.808 | −1.733 | −2.164 | −2.239 | −2.309 |
| (7) | f34/f | 0.533 | 0.501 | 0.588 | 0.577 | 0.574 |
| (8) | \|R2r/R3f\| | 0.291 | 0.279 | 0.659 | 0.142 | 0.021 |
| (9) | D12/f | 0.036 | 0.036 | 0.034 | 0.040 | 0.042 |
| (10) | D12/D23 | 0.342 | 0.345 | 0.335 | 0.460 | 0.500 |
| (11) | D34/D23 | 0.931 | 0.908 | 0.975 | 1.864 | 2.075 |
| (12) | D34/T4 | 0.527 | 0.477 | 0.591 | 0.964 | 1.081 |
| (13) | vd4 | 55.9 | 55.9 | 55.9 | 55.9 | 55.9 |
| (14) | Dep/Hmax | 0.655 | 0.664 | 0.668 | 0.647 | 0.643 |

Therefore, when the imaging lens of the above-described embodiments is applied in an imaging optical system such as cameras built in portable information devices, namely, smartphones, cellular phones, and mobile information terminals, game consoles, home appliances, and automobiles, it is possible to co-achieve both high performance and downsizing of the cameras.

The present invention is applicable in an imaging lens that is mounted in a relatively small-sized camera, such as cameras built in portable information devices, namely smartphones etc., medical devices, game consoles, home appliances, and automobiles.

DESCRIPTION OF REFERENCE NUMERALS

X: optical axis
ST: aperture stop
L1: first lens
L2: second lens
L3: third lens
L4: fourth lens
L5: fifth lens
IR: filter
IM: image plane

What is claimed is:

1. An imaging lens for forming an image of an object on an image sensor comprising, in order from an object side to an image side,
a first lens with positive refractive power,
a second lens with negative refractive power,
a third lens,
a fourth lens with positive refractive power, and
a fifth lens with negative refractive power,
wherein an image-side surface of said fourth lens is convex in a paraxial region, an object-side surface of said fifth lens is an aspheric surface having at least one inflection point, and the following conditional expressions (1) to (4) and (10') are satisfied:

$$f/Dep<2.0 \quad (1)$$

$$1.2<T3/T2<1.8 \quad (2)$$

$$15<vd3<35 \quad (3)$$

$$-1.0<R5f/R5r<-0.3 \quad (4)$$

$$0.318<=D12/D23<0.6 \quad (10')$$

where
f: a focal length of an overall optical system of the imaging lens,
Dep: an entrance pupil diameter of the imaging lens,
T2: a thickness along an optical axis X of the second lens L2,
T3: a thickness along an optical axis X of the third lens L3,
vd3: an abbe number at d-ray of the third lens L3,
R5f: a curvature radius of an object-side surface of the fifth lens L5,
R5r: a curvature radius of an image-side surface of the fifth lens L5,
D12: a distance along the optical axis between the first lens and the second lens, and
D23: a distance along the optical axis between the second lens and the third lens.

2. The imaging lens according to claim 1, wherein the following conditional expression (5) is satisfied:

$$5.0<|f3|/f<95.0 \quad (5)$$

where
f3: a focal length of the third lens.

3. The imaging lens according to claim 1, wherein the following conditional expression (6) is satisfied:

$$-5.0<f23/f<-1.5 \quad (6)$$

where
f23: a composite focal length of the second lens and the third lens.

4. The imaging lens according to claim 1, wherein the following conditional expression (7) is satisfied:

$$0.2<f34/f<1.0 \quad (7)$$

where
f34: a composite focal length of the third lens and the fourth lens.

5. The imaging lens according to claim 1, wherein the following conditional expression (8) is satisfied:

$$0.02<|R2r/R3f|<1.0 \quad (8)$$

where
R2r: a curvature radius of an image-side surface of the second lens, and
R3f: a curvature radius of an object-side surface of the third lens.

6. The imaging lens according to claim 1, wherein the following conditional expression (9) is satisfied:

$$0.01<D12/f<0.08 \quad (9)$$

where
D12: a distance along the optical axis between the first lens and the second lens.

* * * * *